United States Patent [19]

Bently et al.

[11] Patent Number: 5,769,545
[45] Date of Patent: Jun. 23, 1998

[54] HYDROSTATIC BEARING FOR SUPPORTING ROTATING EQUIPMENT, A FLUID HANDLING SYSTEM ASSOCIATED THEREWITH, A CONTROL SYSTEM THEREFORE, METHOD AND APPARATUS

[75] Inventors: Donald E. Bently; John W. Grant, both of Minden, Nev.

[73] Assignee: Bently Nevada Corporation, Minden, Nev.

[21] Appl. No.: 759,415

[22] Filed: Dec. 4, 1996

[51] Int. Cl.$^6$ .................................................. F16C 32/06
[52] U.S. Cl. ............................ 384/118; 384/448; 384/99; 384/114
[58] Field of Search ...................................... 384/118, 448, 384/99, 111, 399, 114

[56] References Cited

U.S. PATENT DOCUMENTS

| | | |
|---|---|---|
| 2,459,826 | 1/1949 | Martellotti . |
| 2,578,712 | 12/1951 | Martellotti . |
| 2,578,713 | 12/1951 | Martellotti . |
| 2,692,803 | 10/1954 | Gerard . |
| 2,879,113 | 3/1959 | DeHart . |
| 2,938,756 | 5/1960 | Loeb . |
| 3,053,589 | 9/1962 | Cameron . |
| 3,271,086 | 9/1966 | Deffrenne . |
| 3,357,759 | 12/1967 | Stephenson . |
| 3,395,952 | 8/1968 | Deffrenne . |
| 3,403,948 | 10/1968 | Deffrenne . |
| 3,432,213 | 3/1969 | Adams . |
| 3,442,560 | 5/1969 | De Gast . |
| 3,588,202 | 6/1971 | Johnson . |
| 3,617,102 | 11/1971 | Wada et al. . |
| 3,658,393 | 4/1972 | Luthi . |
| 3,742,653 | 7/1973 | Kano et al. . |
| 3,749,456 | 7/1973 | Whitaker . |
| 4,035,037 | 7/1977 | Cunningham . |
| 4,193,644 | 3/1980 | Miyashita et al. . |
| 4,215,903 | 8/1980 | Andrews . |
| 4,327,592 | 5/1982 | Fincke . |
| 4,351,574 | 9/1982 | Furukawa et al. . |
| 4,504,048 | 3/1985 | Shiba et al. . |
| 4,512,671 | 4/1985 | Giers et al. . |
| 4,569,562 | 2/1986 | Sato et al. . |
| 4,630,942 | 12/1986 | Tsumaki et al. . |
| 4,643,592 | 2/1987 | Lewis et al. . |
| 4,650,123 | 3/1987 | Ooishi . |
| 4,685,813 | 8/1987 | Moog . |
| 4,696,585 | 9/1987 | Swearingen . |
| 4,704,879 | 11/1987 | Christ et al. . |
| 4,767,223 | 8/1988 | Goodwin . |
| 4,834,559 | 5/1989 | Kalvoda . |
| 4,944,609 | 7/1990 | Salter, Jr. et al. . |
| 4,947,639 | 8/1990 | Hibner et al. . |
| 5,033,317 | 7/1991 | Van Haag . |
| 5,034,639 | 7/1991 | Huss et al. . |
| 5,063,322 | 11/1991 | Sugita et al. . |
| 5,064,297 | 11/1991 | Tanaka et al. . |
| 5,066,197 | 11/1991 | Champagne . |
| 5,099,966 | 3/1992 | Wöhrl . |
| 5,104,237 | 4/1992 | Slocum . |
| 5,121,341 | 6/1992 | McCabria et al. . |
| 5,149,206 | 9/1992 | Bobo . |
| 5,197,807 | 3/1993 | Kuznar . |
| 5,201,585 | 4/1993 | Gans et al. . |
| 5,203,762 | 4/1993 | Cooperstein . |
| 5,219,447 | 6/1993 | Arvidsson . |
| 5,238,308 | 8/1993 | Lang et al. . |
| 5,281,032 | 1/1994 | Slocum . |
| 5,344,239 | 9/1994 | Stallone et al. . |

(List continued on next page.)

FOREIGN PATENT DOCUMENTS

| | | |
|---|---|---|
| 0045110 | 5/1986 | Japan . |
| 2121892 | 1/1984 | United Kingdom . |

*Primary Examiner*—Lenard A. Footland
*Attorney, Agent, or Firm*—Bernhard Kreten

[57] ABSTRACT

A bearing for supporting rotating equipment, a fluid handling system associated therewith, a control system therefore, method and apparatus is disclosed in which a rotating shaft is suspended in a fluid. Shaft precession is monitored to provide a compensatory feed back loop to maintain proper shaft registry in the face of loads.

20 Claims, 16 Drawing Sheets

U.S. PATENT DOCUMENTS

| | | |
|---|---|---|
| 5,356,225 | 10/1994 | Hanes et al. . |
| 5,360,273 | 11/1994 | Buckmann . |
| 5,364,190 | 11/1994 | Ochiai et al. . |
| 5,374,129 | 12/1994 | Vohr et al. . |
| 5,385,171 | 1/1995 | Cleasby . |
| 5,391,002 | 2/1995 | Eigenbrod . |
| 5,447,375 | 9/1995 | Ochiai et al. . |
| 5,452,735 | 9/1995 | Gamble et al. . |
| 5,484,208 | 1/1996 | Kane et al. . |

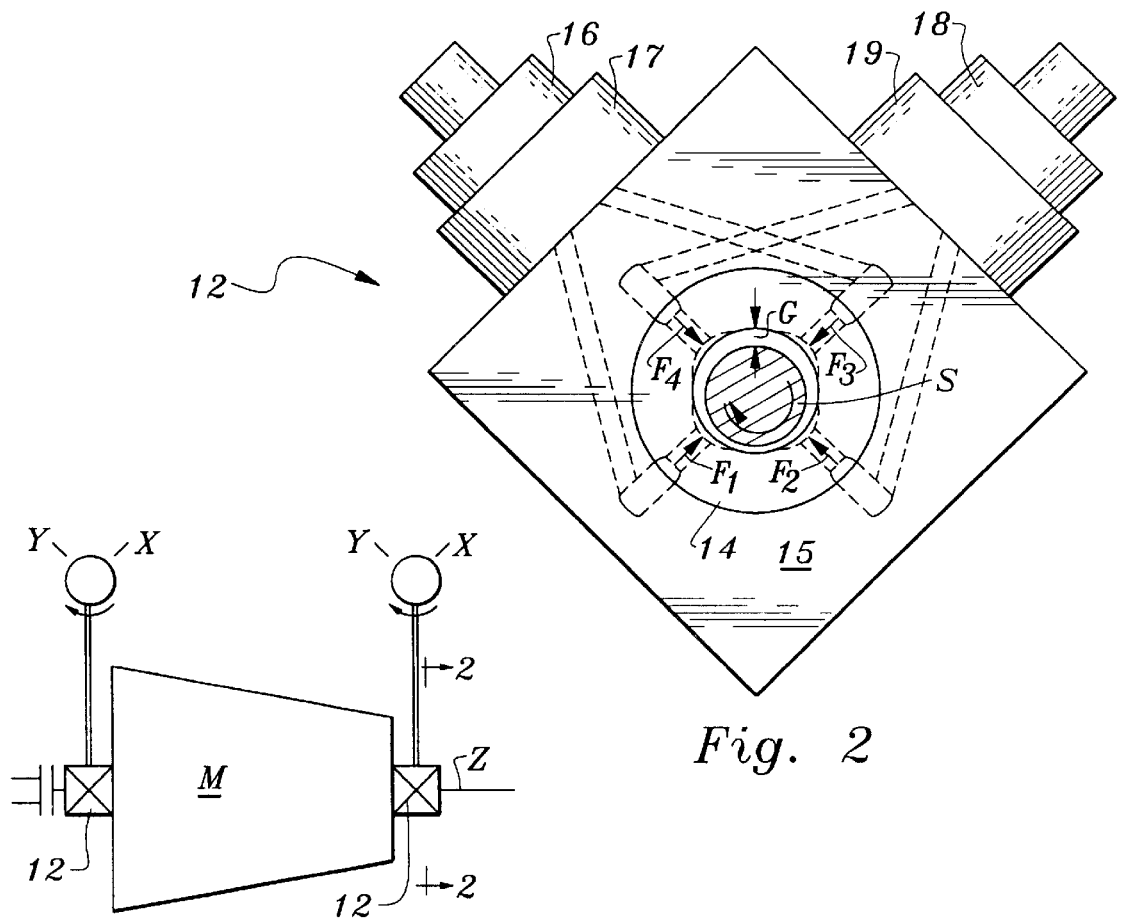
Fig. 2
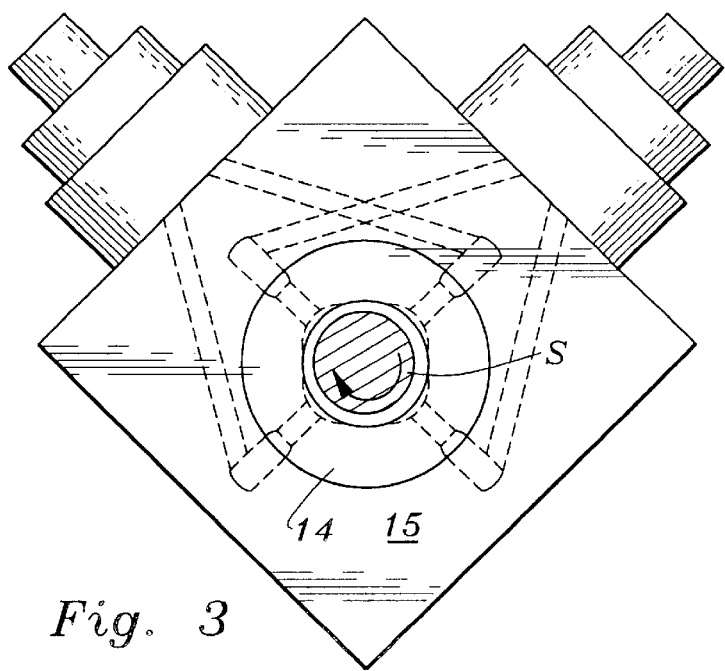
Fig. 1
Fig. 3

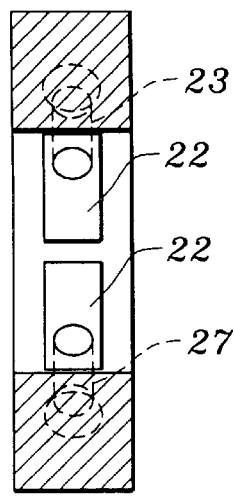
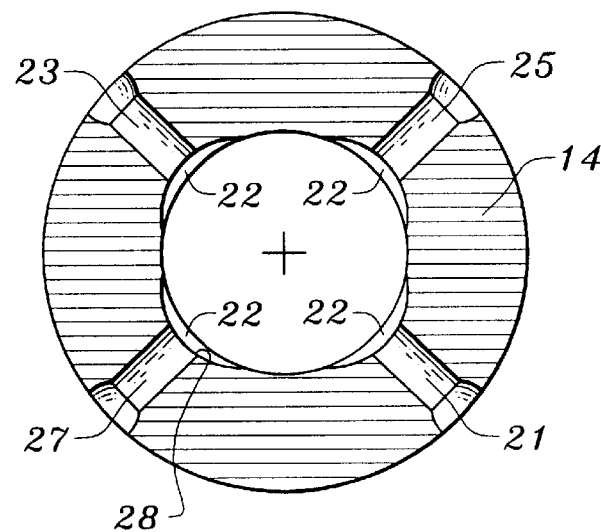
Fig. 4   Fig. 5
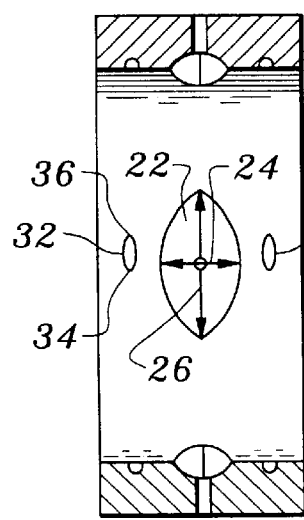
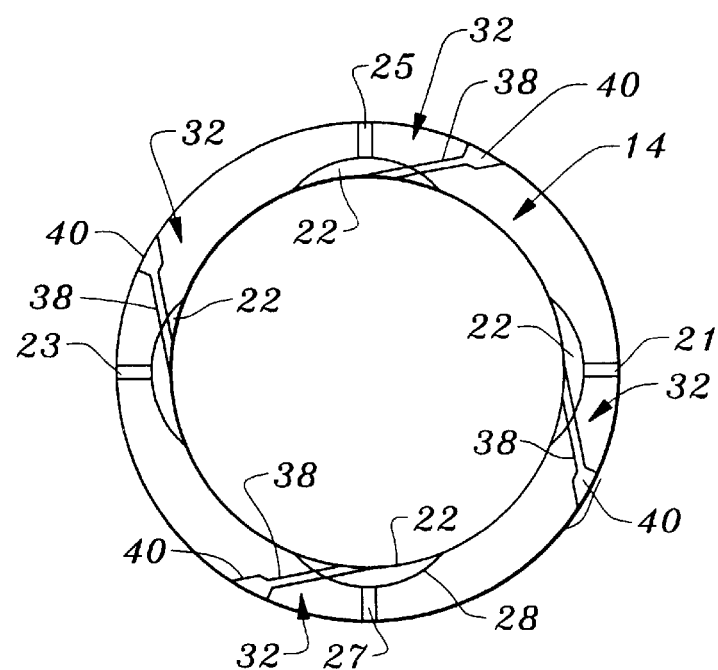
Fig. 6   Fig. 7

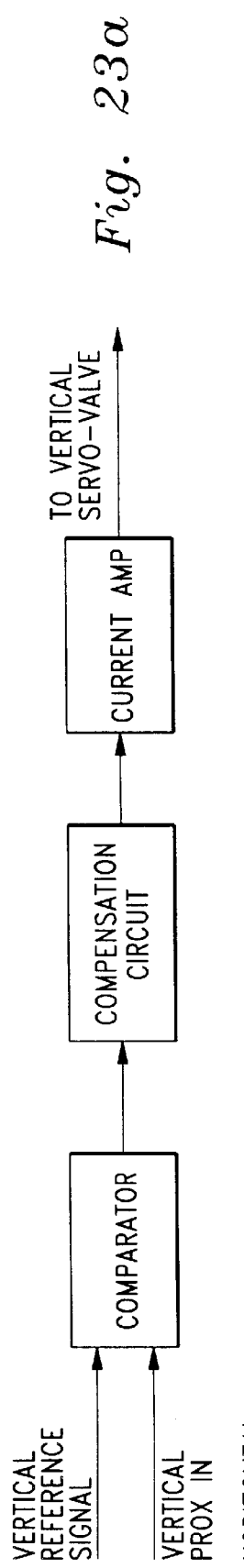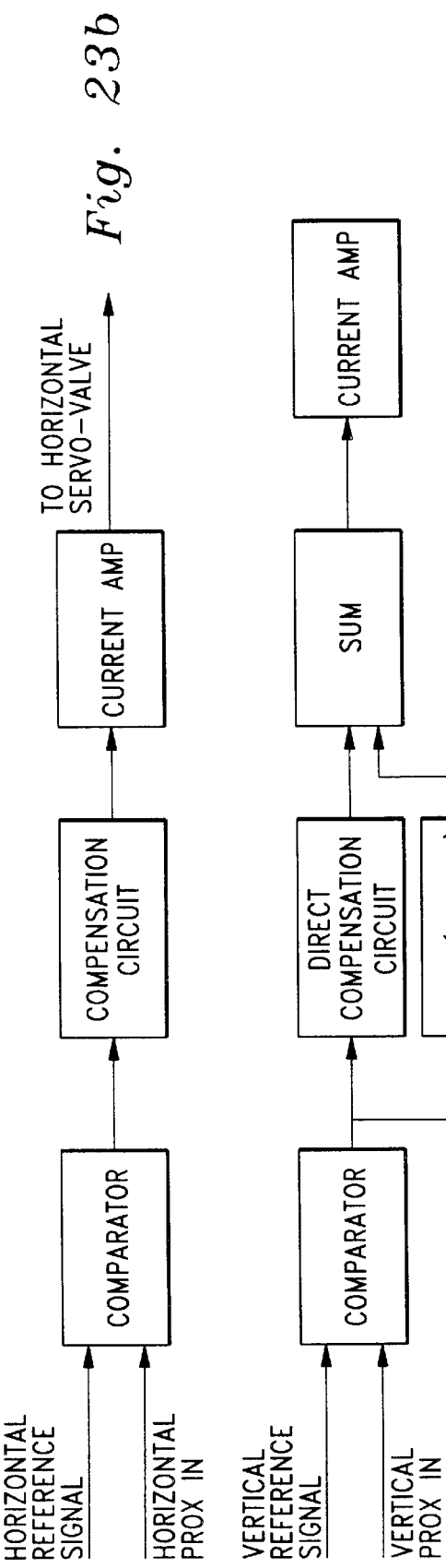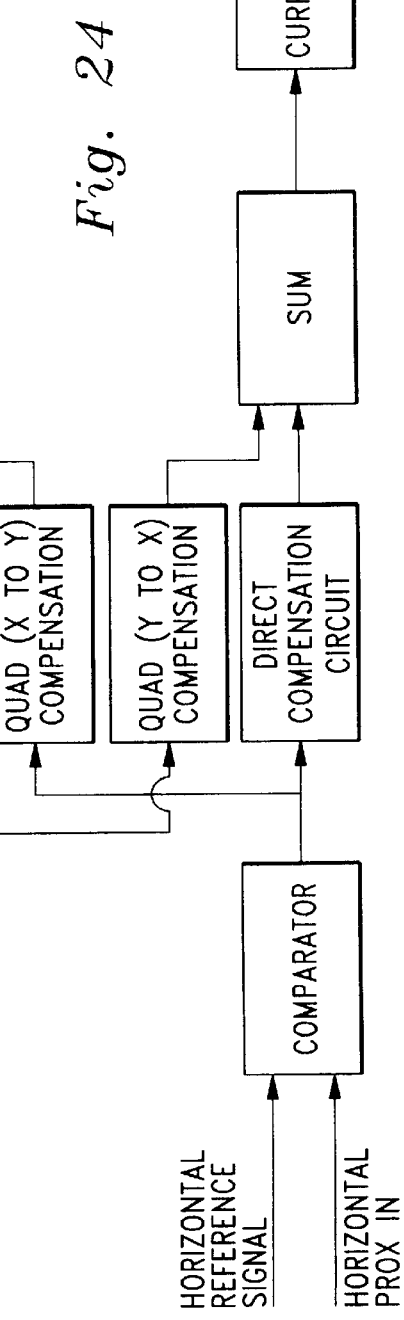

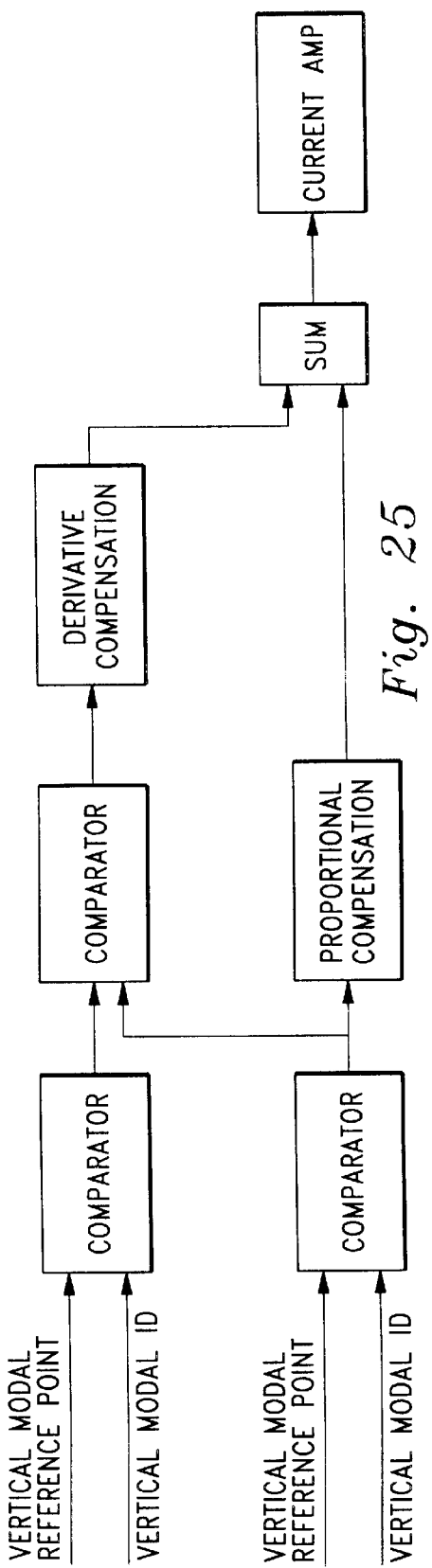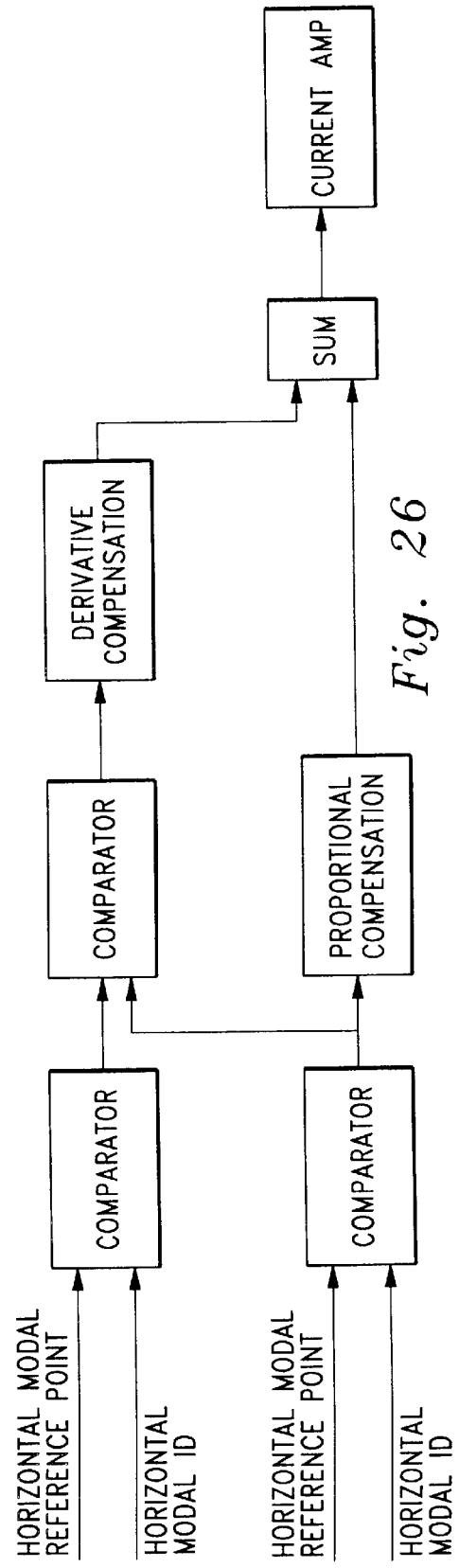

HYDROSTATIC BEARING FOR SUPPORTING ROTATING EQUIPMENT, A FLUID HANDLING SYSTEM ASSOCIATED THEREWITH, A CONTROL SYSTEM THEREFORE, METHOD AND APPARATUS

FIELD OF THE INVENTION

This invention relates generally to instrumentalities which support rotating equipment especially on a shaft. More specifically, the instant invention is directed to a fluid bearing that supports a rotating shaft where the bearing is fed fluid via a handling system to maintain the shaft clearance with respect to stationary parts. The invention includes a control system for dynamically aligning and balancing the shaft motion by the fluid bearing, as a function of static and dynamic loading.

BACKGROUND OF THE INVENTION

Rotating equipment, particularly equipment exposed to hostile environments and cycling or impulse loads, have heretofore not been able to benefit from bearing supports which can statically and dynamically compensate for impending rotor motion leading to rubbing of rotating and stationary parts. Further, those impulses which provide intermittent or constant loads on the bearing supports and other anomalous loadings such as bearing loading due to forces imposed by movement of the axis of rotation cannot be addressed by a "slowly responding" bearing.

While most bearings rely on a thin film of lubricant between rotating elements such as a ball bearing assembly, hydrodynamic bearings and magnetic bearings, some attempts have been made to allow shafts to be supported exclusively by hydrostatic fluid force.

The following patents reflect the state of the art of which applicant is aware and has been included herewith to acknowledge the applicant's duty to disclose prior art. None of these patents, however, teach singly, nor render obvious when considered in any conceivable combination, the nexus of the instant invention as disclosed in greater detail hereinafter and as particularly claimed.

| Pat. No. | ISSUE DATE | INVENTOR |
| --- | --- | --- |
| U.S. Patent DOCUMENTS | | |
| 2,459,826 | January 25, 1949 | Martellotti |
| 2,578,712 | December 18, 1951 | Martellotti |
| 2,578,713 | December 18, 1951 | Martellotti |
| 2,692,803 | October 26, 1954 | Gerard |
| 2,879,113 | March 24, 1959 | DeHart |
| 2,938,756 | May 31, 1960 | Loeb |
| 3,053,589 | September 11, 1962 | Cameron |
| 3,271,086 | September 6, 1966 | Deffrenne |
| 3,357,759 | December 12, 1967 | Stephenson |
| 3,395,952 | August 6, 1968 | Deffrenne |
| 3,403,948 | October 1, 1968 | Deffrenne |
| 3,432,213 | March 11, 1969 | Adams |
| 3,442,560 | May 6, 1969 | De Gast |
| 3,588,202 | June 28, 1971 | Johnson |
| 3,617,102 | November 2, 1971 | Wada, et al. |
| 3,658,393 | April 25, 1972 | Luthi |
| 3,742,653 | July 3, 1973 | Kano, et al. |
| 3,749,456 | July 31, 1973 | Whitaker |
| 4,035,037 | July 12, 1977 | Cunningham |
| 4,193,644 | March 18, 1980 | Miyashita, et al. |
| 4,215,903 | August 5, 1980 | Andrews |
| 4,327,592 | May 4, 1982 | Fincke |
| 4,351,574 | September 28, 1982 | Furukawa, et al. |
| 4,504,048 | March 12, 1985 | Shiba, et al. |

-continued

| Pat. No. | ISSUE DATE | INVENTOR |
| --- | --- | --- |
| 4,512,671 | August 23, 1985 | Giers, et al. |
| 4,569,562 | February 11, 1986 | Sato, et al. |
| 4,630,942 | December 23, 1986 | Tsumaki, et al. |
| 4,643,592 | February 17, 1987 | Lewis, et al. |
| 4,650,123 | March 17, 1987 | Ooishi |
| 4,685,813 | August 11, 1987 | Moog |
| 4,696,585 | September 29, 1987 | Swearingen |
| 4,704,879 | November 10, 1987 | Christ, et al. |
| 4,767,223 | August 30, 1988 | Goodwin |
| 4,834,559 | May 30, 1989 | Kalvoda |
| 4,944,609 | July 31, 1990 | Salter, Jr., et al. |
| 4,947,639 | August 14, 1990 | Hibner, et al. |
| 5,033,317 | July 23, 1991 | Van Haag |
| 5,034,639 | July 23, 1991 | Huss, et al. |
| 5,063,322 | November 5, 1991 | Sugita, et al. |
| 5,064,297 | November 12, 1991 | Tanaka, et al. |
| 5,066,197 | November 19, 1991 | Champagne |
| 5,099,966 | March 31, 1992 | Wöhrl |
| 5,104,237 | April 14, 1992 | Slocum |
| 5,121,341 | June 9, 1992 | McCabria, et al. |
| 5,149,206 | September 22, 1992 | Bobo |
| 5,197,807 | March 30, 1993 | Kuznar |
| 5,201,585 | April 13, 1993 | Gans, et al. |
| 5,203,762 | April 20, 1993 | Cooperstein |
| 5,219,447 | June 15, 1993 | Arvidsson |
| 5,238,308 | August 24, 1993 | Lang, et al. |
| 5,281,032 | January 25, 1994 | Slocum |
| 5,344,239 | September 6, 1994 | Stallone, et al. |
| 5,356,225 | October 18, 1994 | Hanes, et al. |
| 5,360,273 | November 1, 1994 | Buckmann |
| 5,364,190 | November 15, 1994 | Ochiai, et al. |
| 5,374,129 | December 20, 1994 | Vohr, et al. |
| 5,391,002 | February 21, 1995 | Eigenbrod |
| 5,447,375 | September 5, 1995 | Ochiai, et al. |
| 5,484,208 | January 16, 1996 | Kane, et al. |
| FOREIGN PATENT DOCUMENTS | | |
| GB 2,121,892 | January 4, 1984 | Mohsin |
| JP 0045110 | May 3, 1986 | Nippon Seiko K.K. |

The patent to Cunningham, U.S. Pat. No. 4,035,037, issued Jul. 12, 1977, teaches a hydrostatic bearing support in which a plurality of pressure plates coact with a housing which has a central bore adapted to receive a rotor and a conventional bearing assembly therebetween. This device uses a fluid film bearing, but unlike the instant invention cannot cause the fluid adjacent the rotor to directly change its force profile to provide centered support for the rotor.

Goodwin, U.S. Pat. No. 4,767,223, issued Aug. 30, 1988, teaches the use of a hydrodynamic journal bearing in which an undriven accumulator attempts to respond to changes occurring within clearance that exists between a journal and its circumscribing bearing bush.

Kano, et al., U.S. Pat. No. 3,742,653, issued Jul. 3, 1973 teaches the use of a control device for the radial displacement of shafts in which a plurality of circumferentially spaced pressure pockets surround the shaft so that pressurized fluid can be differentially admitted via a control valve to control the radial displacement of the axis of the shaft. Because the purpose for this device is to control the feed for a grinding wheel to provide full automation during a grinding cycle, the cycle reflects predictable force profiles.

The patent to Miyashita, et al., U.S. Pat. No. 4,193,644, issued Mar. 18, 1980 teaches the use of a servo control system to position a hydrostatically supported member such as the table of a machine tool or a rotary shaft in which a closed loop control system includes a differential amplifier for effecting a subtraction operation between the amount of displacement of a member and an amount of reference signal. A servo amplifier delivers a control signal while a servovalve supplies operating pressure upon receipt of the control signal to the member.

All of the foregoing patents specifically discussed and those which were cited to show the state of the art further fail to provide substantially instantaneous response to shaft perturbations which cause resonant frequencies and vibration and which drive the shaft from a pure center rotation. One other problem the prior art has failed to resolve is that because incompressible fluid theoretically provides a desirable cushion between a rotating member and its stationary support, incompressible fluids also have an inherent lag in the ability to respond to dynamic changes, particularly sudden unexpected loads and high speed fluctuations.

SUMMARY OF THE INVENTION

This instant invention is distinguished over the known prior art in a multiplicity of ways. For one thing, the problem of the inertia associated with the hydrostatic fluid has been solved according to the instant invention. Further, the solution in quickly delivering hydrostatic fluid necessarily involves initial accurate sensing with respect to anomalies which induce off center shaft positioning. Once detected, the anomaly needs to be rectified by substantially instantaneous delivery of corrective fluid. This problem is resolved according to the present invention by fluid distribution ports. These ports distribute fluid via a servovalve to diametrically opposed sides of a bearing. In effect, the servovalve allocates a large quantity of constantly flowing fluid to diametrically opposed sides of the shaft to maintain hydrostatic effectiveness. In addition, the instant invention provides a dynamically proportional fluid flow in addition to the static bias flow to react with the shaft/system forces to actively reduce vibration. As a result, there is no appreciable time lag in delivering the correcting fluid, thereby promulgating stable shaft rotation.

In addition, whereas prior fluid bearings had problems with "swirl" (skin friction between the rotating shaft and the fluid which causes the fluid to join the shaft in rotation) the instant invention provides strong impediments to fluid swirl by providing ,inter alia, dynamically proportional fluid flow in addition to the static bias flow to react with the shaft.

Shaft position is monitored for anomalous displacement. The existence of an anomaly causes compensation in the form of a fluidic force differential in a direction calculated to remove the anomaly. In combination with the distribution ports, the reaction to anomalies is substantially instantaneous thereby providing balanced, high speed rotation.

OBJECTS OF THE INVENTION

Accordingly, it is a primary object of the present invention to provide a new and novel fluid bearing system.

A further object of the present invention is to provide a device as characterized above which is substantially instantaneous in its response to anomalies in shaft excursions.

A further object of the present invention is to provide a device as characterized above in which the tendency of the fluid to be influenced by the shaft rotation will have been minimized, thereby minimizing swirl.

A further object of the present invention is to provide a device as characterized above which is extremely reliable in use and enhances the safety associated with the operation of a machine being so affected.

A further object of the present invention is to provide a device as characterized above which may induce a perturbation by delivering a differential fluid force to opposed areas of a rotating shaft (for example of an on-line machine) and then monitor and analyze the real time machine response to obtain diagnostic, base-line characteristics or signatures of that specific machine.

A further object of the present invention is to provide a device as characterized above to use fluid handling and control signals to measure internal machine forces.

A further object of the present invention is to provide a device as characterized above which provides machine balance even when, for example, the machine is a turbine which has thrown a blade such that the invention allows time for machine shut down without catastrophic results.

A further object of the present invention is to provide a device as characterized above which provides on-line machinery alignment, within the clearances, to provide a tool for optimizing machinery performance such as power efficiency and/or stability.

Viewed from a first vantage point, it is an object of the present invention to provide a bearing system for controlling shaft precession, comprising, in combination: a shaft, a bearing block circumscribing the shaft, the block having portal means directed to the shaft, incompressible fluid passing through the portal means to support the shaft away from the block, precession detecting means coupled to the shaft, and incompressible fluid directing means driven by the detecting means and driving the incompressible fluid through the portals to oppose shaft precession.

Viewed from a second vantage point, it is an object of the present invention to provide a method of abating shaft precession, the steps including: monitoring a shaft for precession, opposing shaft precession by fluid contact with the shaft including delivering the fluid in diametrically opposed streams to the shaft through portals, determining whether the opposing streams should have pressure differentials, and delivering the differential pressure to the portals.

Viewed from a third vantage point, it is an object of the present invention to provide a shaft support, comprising, in combination: a bearing block, a shaft passing through the bearing block, sensors to monitor shaft precession, means to compare sensor output versus a standard, means to deliver continuous quantities of fluid to the bearing block based on sensor data, and means to prevent swirl at an area between the shaft and bearing block.

Viewed from a fourth vantage point, it is an object of the present invention to provide a method for simulating differential shaft forces to identify operating parameters of a rotor shaft of an on-line machine, the steps including: inducing stimulus to a rotor shaft correlative of a system anomaly; monitoring a real time response signature of the rotor shaft; processing the real-time response signature to obtain machine characteristics; applying a correlative stimulus to the rotor shaft; and monitoring subsequent artifacts correlative of the anomaly being rectified.

Viewed from a fifth vantage point, it is an object of the present invention to provide a method for measuring internal machine forces acting on a rotating shaft of a running machine, the steps including: directing a fluidic force on the rotating shaft of the machine from at least one valve under the direction of a control signal; monitoring the shaft in response to the fluidic forces directed thereon; providing a corrective control signal to at least one valve; and controlling the fluidic force on the shaft until the shaft is repositioned.

Viewed from a sixth vantage point, it is an object of the present invention to provide a hydrostatic fluid bearing for supporting a shaft of a machine, comprising, in combination: a bearing block circumscribing the shaft, the block having portal means directed to the shaft; a fluid handling means for providing a bias flow of fluid through the portal means to support the shaft away from the block; and means for directing a dynamically proportioned fluid flow through the portal means in addition to the static bias flow for promulgating stable shaft rotation.

These and other objects will be made manifest when considering the following detailed specification when taken in conjunction with the appended drawing figures.

BRIEF DESCRIPTION OF THE DRAWINGS

FIG. 1 is a schematic view of a load bearing shaft with a hydrostatic fluid bearing apparatus according to the present invention disposed on sides of the shaft between which the load is imposed.

FIG. 2 is a partial sectional view taken along lines 2—2 of FIG. 1 showing the effect of a load on the shaft and the bearing according to the present invention.

FIG. 3 is a view similar to FIG. 2 with the load corrected.

FIGS. 4 and 5 show one form of a bearing which delivers fluid to cause the correction shown in FIG. 3.

FIGS. 6 and 7 show another form of a bearing which delivers fluid to cause the correction shown in FIG. 3.

FIGS. 23A and 23B detail another form of the horizontal and vertical controller circuit.

FIG. 24 details another form of the horizontal and vertical controller circuit. detail another form of the horizontal and vertical controller circuit.

FIGS. 25 and 26 detail one form of a horizontal and vertical controller circuit for providing system modeling.

DESCRIPTION OF PREFERRED EMBODIMENTS

Figure 8:
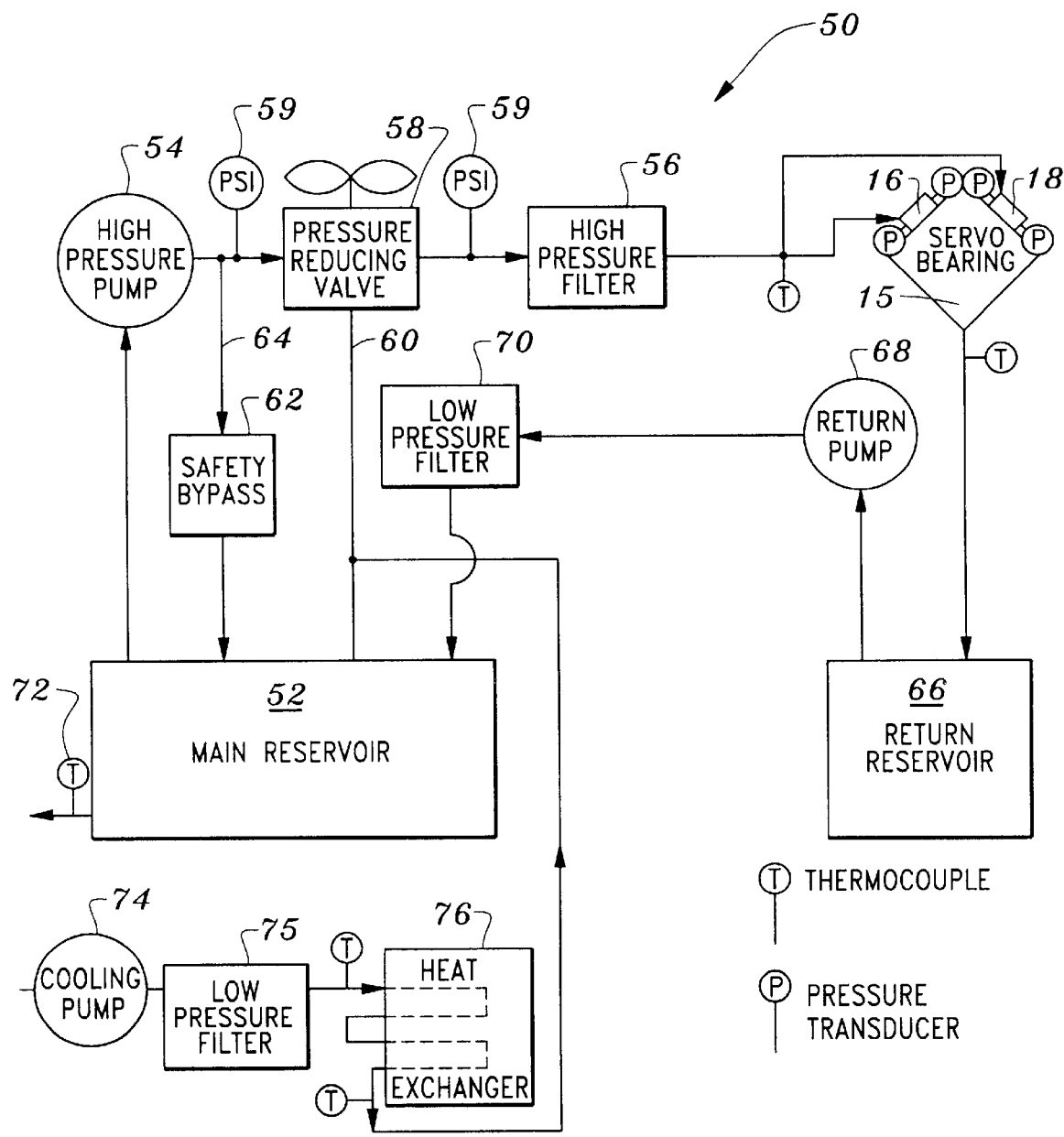
FIG. 8 is a fluid diagram showing how fluid is delivered to the FIG. 3 fluid bearing.

Considering the drawings, wherein like reference numerals denote like parts throughout the various drawing figures, reference numeral 10 is directed to the apparatus according to the present invention.

Figure 18:
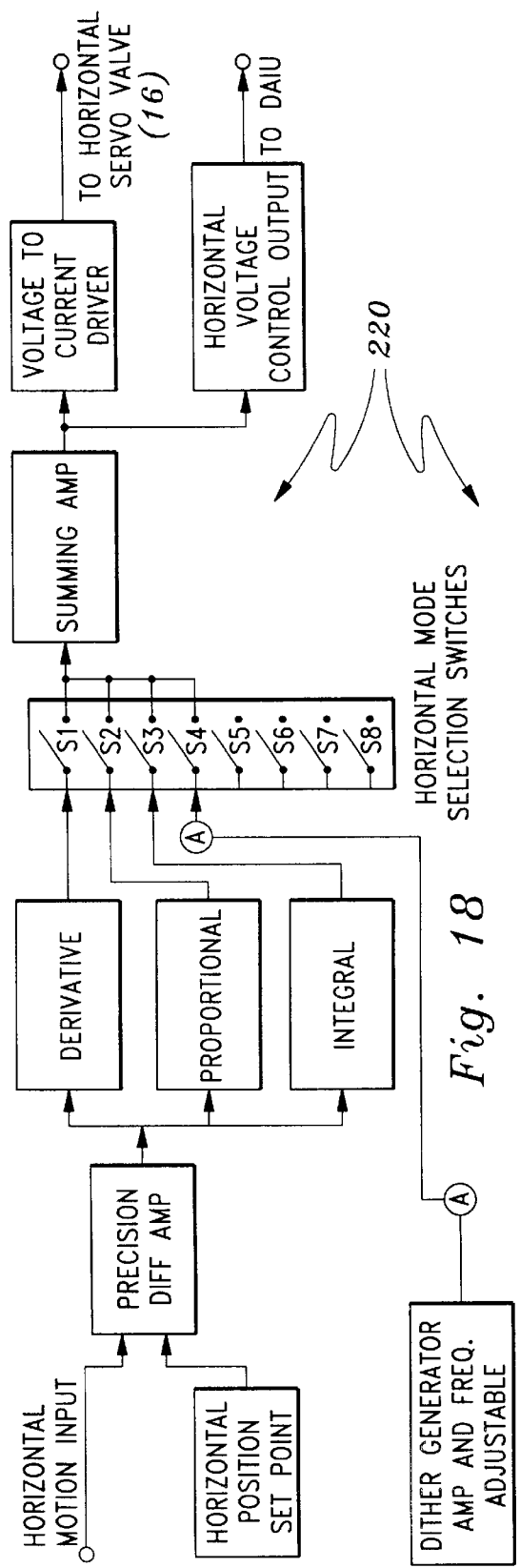
FIGS. 18 and 19 detail one form of the horizontal and vertical controller circuit.

In essence and referring to the drawing figures, the present invention provides a dynamically balanced fluid bearing system 12 (FIG. 2) including a fluid handling system 50 (FIGS. 8 and 9) and a control system 200 (FIG. 18). The fluid handling system 50 preferably includes two servovalves 16, 18 (FIG. 2) which direct fluid through portals 21, 23, 25, 27 (FIG. 5) of a fluid bearing 14 of a bearing block 15 such that fluid forces "F" may be applied to a rotor shaft S of a machine M. The control system 200 provides the control signals which manipulate the servovalves 16, 18 in order to control the flow of the fluid through the portals 21, 23, 25 and 27 which lead to a clearance between the rotor shaft S and the stationary fluid bearing 14. The fluid suspends the rotor shaft S away from the bearing 14 of the machine M while actively controlling the static and dynamic motion of the rotor shaft S.

One embodiment of the control system 200 employs at least one XY pair of proximity transducers 202, 204 (FIG. 16) to measure the static and dynamic motion of the rotor shaft S relative to the bearing. The XY pair of proximity transducers 202, 204 provide a two dimensional coordinate of the position of the rotor shaft within the bearing when fixed orthogonal to one another. A third proximity transducer 206 (FIG. 16) may be fixed orthogonal with respect to both the X and Y proximity transducers 202, 204 to obtain a three dimensional coordinate of the position of the rotor shaft S within the bearing 14.

Figure 19:
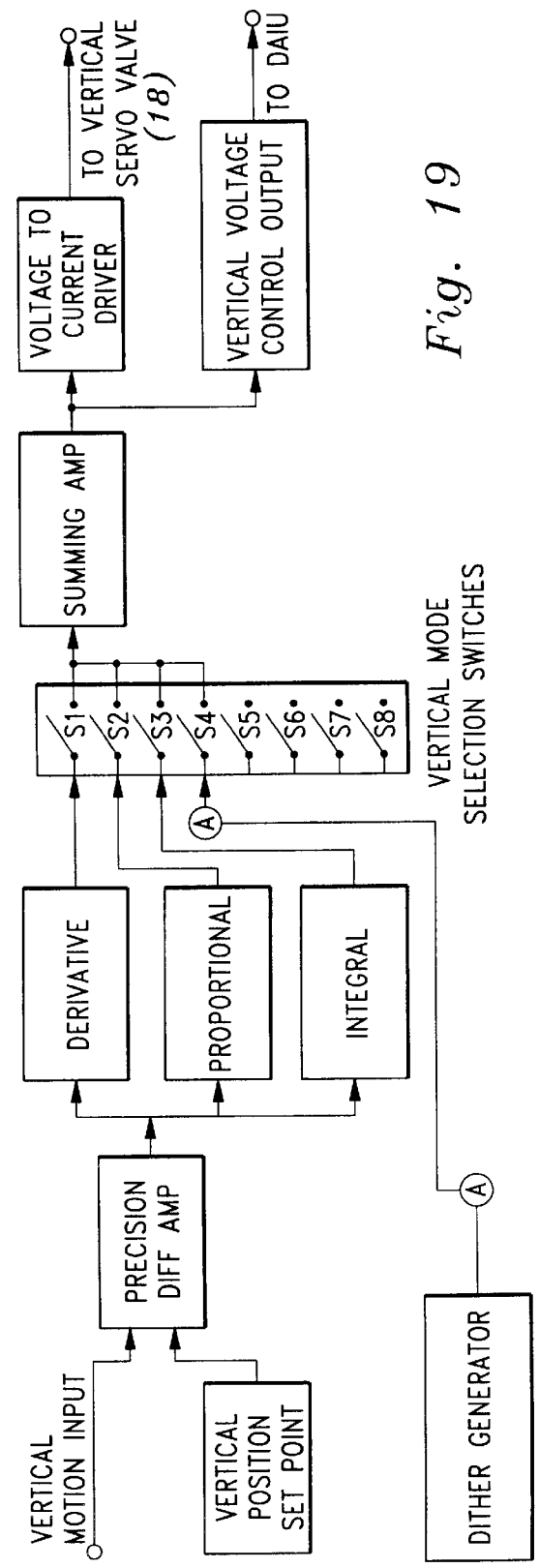
Figure 20:
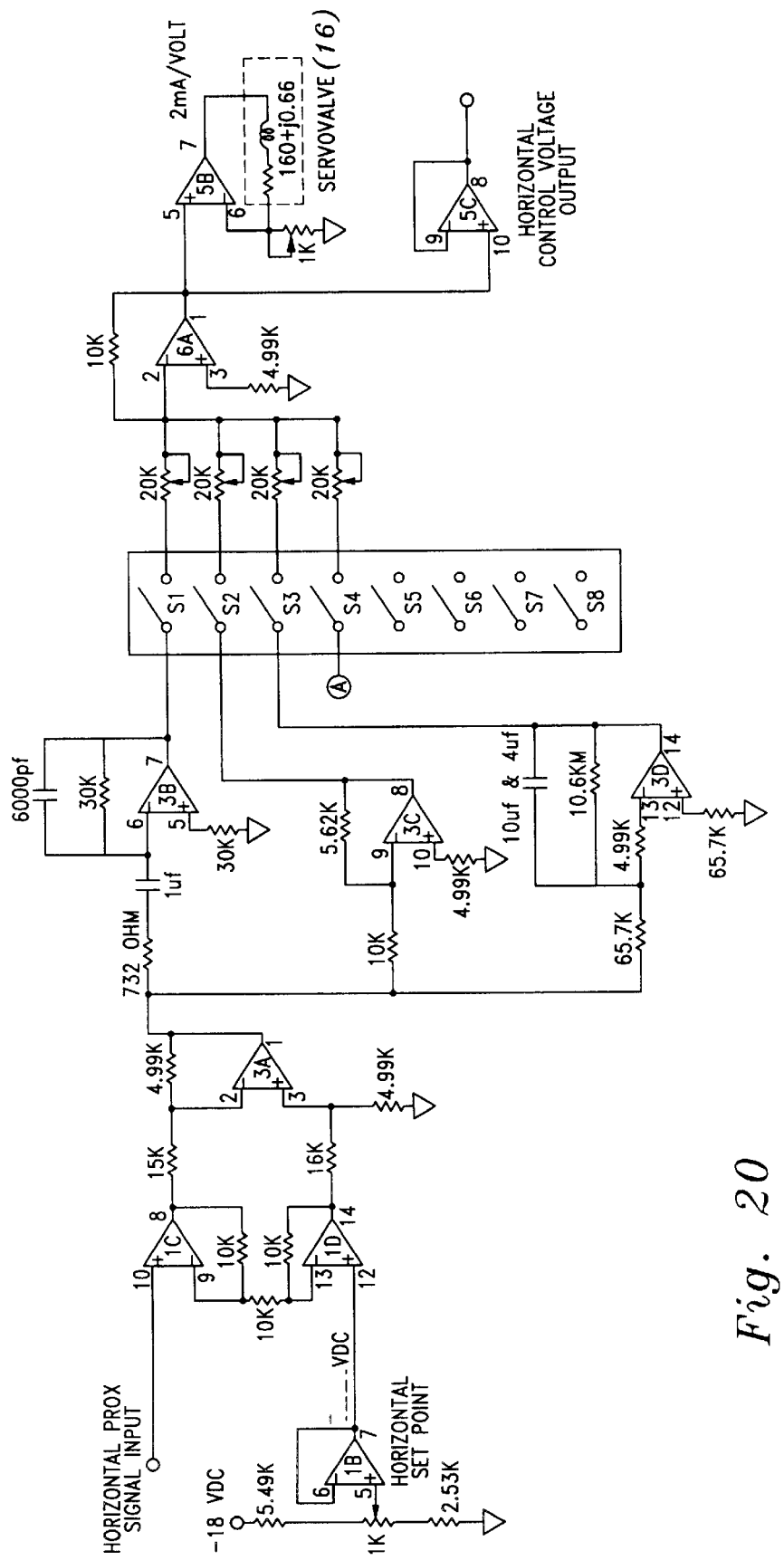
FIGS. 20, 21 and 22 and further particularize FIGS. 18 and 19.
Figure 21:
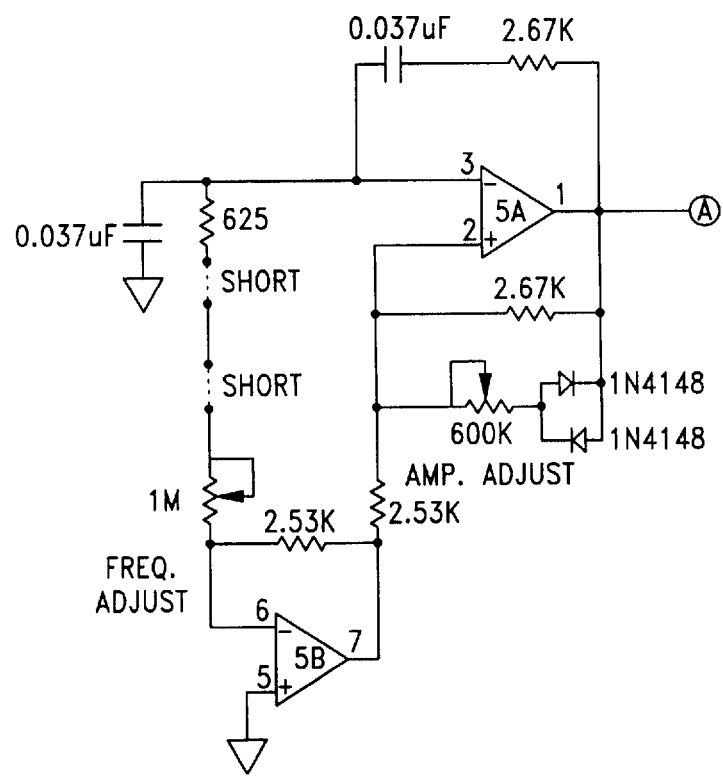
Figure 22:
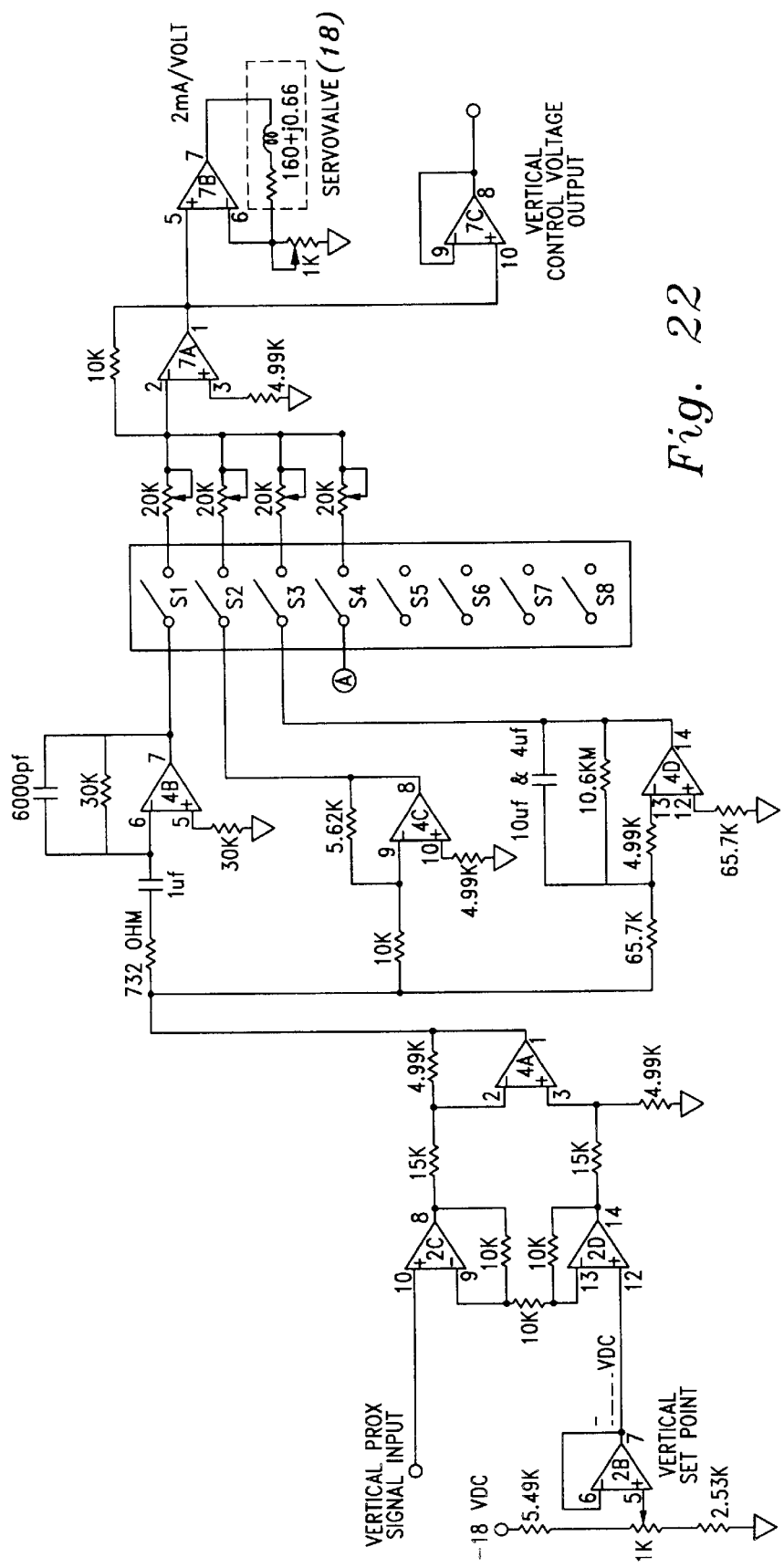

Each proximity transducer converts the motion of the rotor shaft to a voltage signal. The proximity voltage signals are outputted to a control circuit 220 (FIGS. 18 and 19). The control circuit 220 accepts the voltage signals as input signals and includes means to compare these input signals with a set of reference voltages correlative to a desired shaft location relative to the bearing and to obtain a difference signal between the input signals and the reference voltages. The outputs of the comparing means are preferably passed to a plurality of PID (proportional integral derivative) circuits of the control circuit. The PID circuits accept the outputs of the comparing means as input signals and provide PID output signals which are a derivative of, an integral of and proportional to the input signals from the comparing means. The PID output signals of each PID circuit are then each weighted with a gain and summed together by a summing circuit. Each summing circuit then outputs a signal to a voltage to current converter circuit which outputs a current signal which drives a respective servovalve to direct fluid and therefore, fluid forces onto the rotor shaft to react against rotor system forces to actively control the dynamic motion, position and stability of the rotor.

Figure 15:
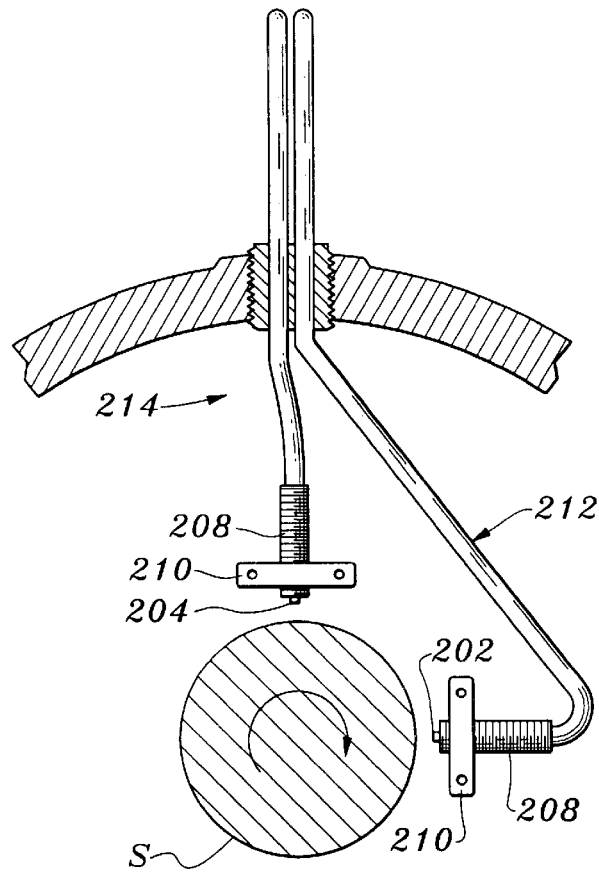
FIG. 15 shows one arrangement for sensors which provide control signals to a control circuit to control the FIG. 10 motor and therefore the shaft's position.
Figure 17:
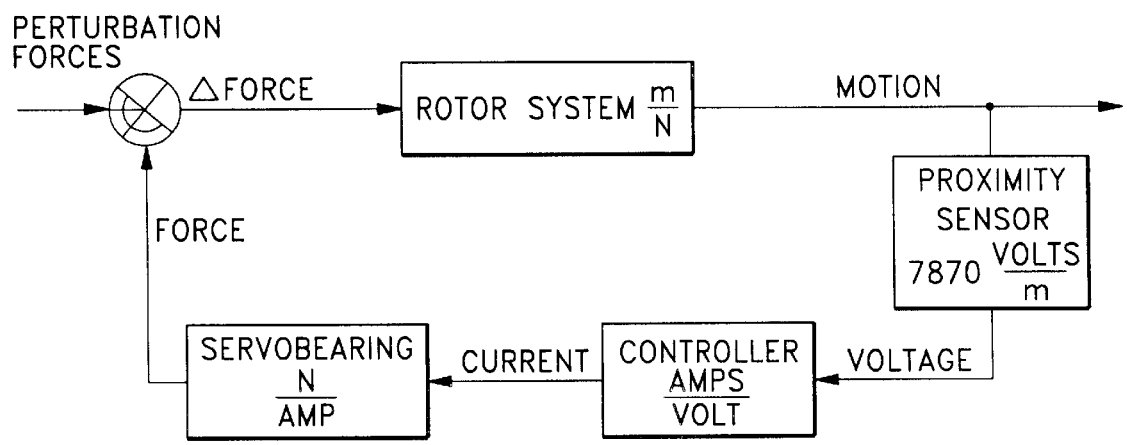
FIG. 17 shows a simplified single channel control loop block diagram of the hydrostatic fluid bearing apparatus according to the present invention.

More specifically, and referring to FIG. 1, a schematic depiction is shown of a machine M being monitored for displacement in three directions with respect to shaft movement: radially and axially relative to a bearing. A typical monitor for radial displacement can be seen in FIG. 15. There, a shaft S will move based on fluctuations induced therein from the machine M. The machine M can be any of several types of instrumentalities which require a bearing supported shaft, such as a turbine, pump, prime mover, generator or the like. First and second transducers 202, 204 respectively, are influenced by the proximity of the shaft S to the transducer. This provides a representation in an X and Y coordinate system since the transducers 202, 204 are ninety degrees apart. The transducers 202, 204 are preferably initially oriented to calibrate their distance a known amount from the shaft S. This calibration can be performed by advancing each transducer's respective threaded outer casing 208 relative to a support 210 having an internal thread therewithin complemental to the threads 208 on the casing. Conductors 212 and 214 transfer the information with respect to the "X" probe 202 and "Y" probe 204.

Figure 16:
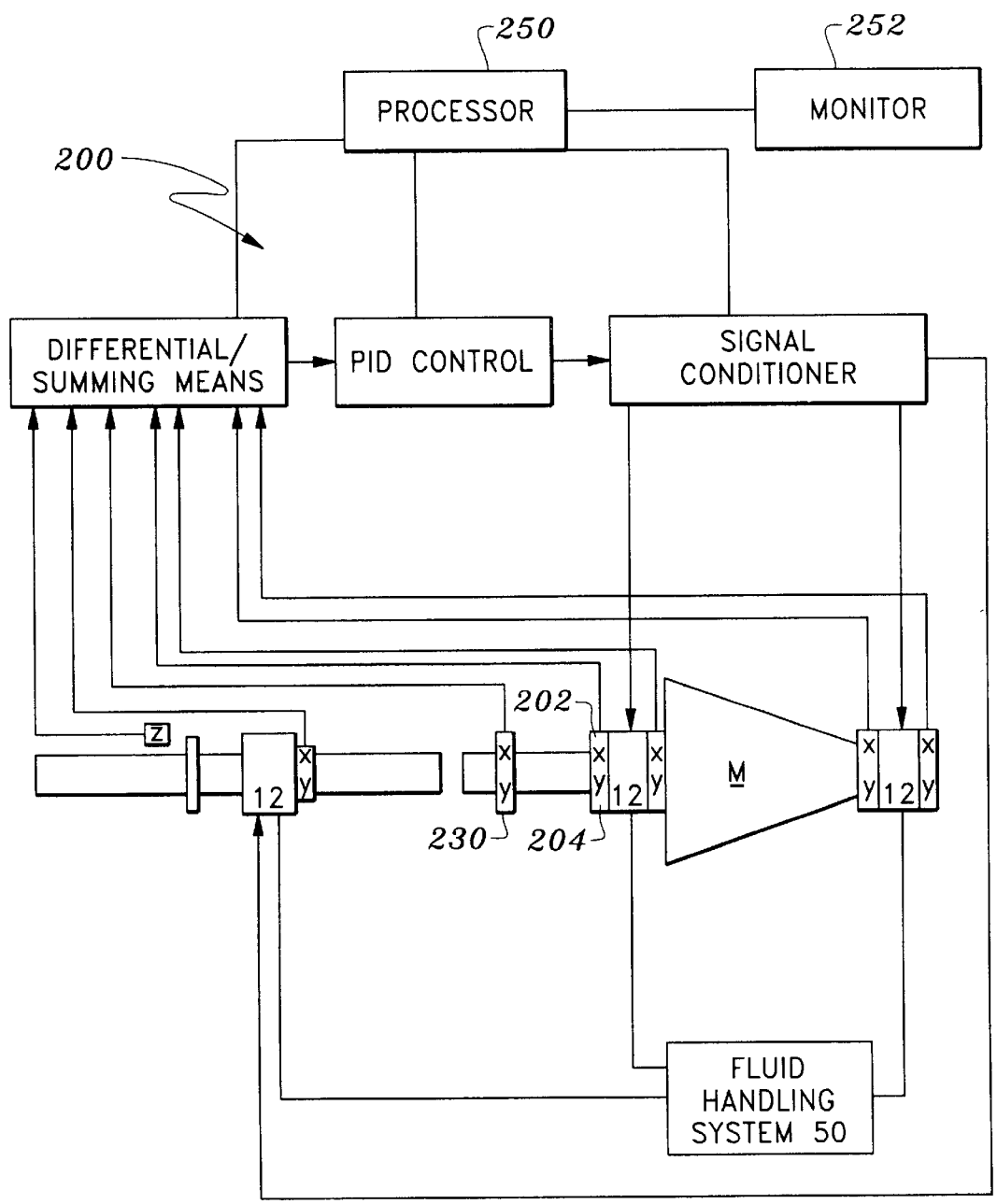
FIG. 16 is an overview of an electro-hydraulic control system for the fluid handling system and bearing.

Referring to FIG. 16, a pair of XY observation probes 202, 204 are disposed on both sides of the bearing apparatus 12 to observe the shaft adjacent both sides of bearing 14. In addition, a pair of modal probes 232, 234 may be disposed adjacent the shaft remote from the bearing apparatus 12.

Figure 28:
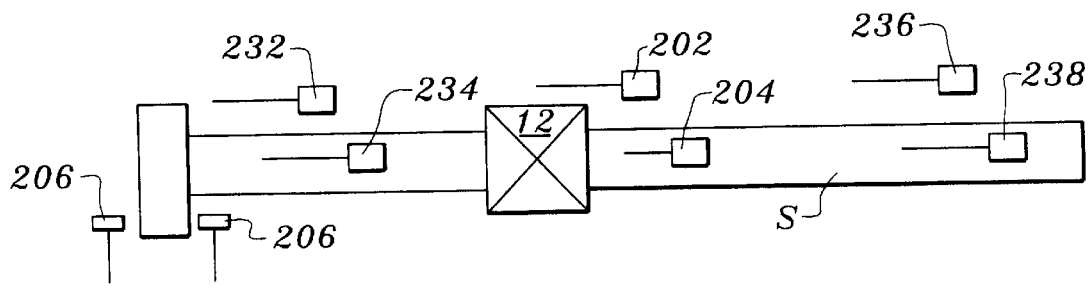
FIG. 28 is a schematic view of the placement of X,Y, and Z sensors and modal identification sensors with respect to a shaft.

Referring to FIG. 28, the observation probes 202, 204 are shown disposed on one side of the bearing apparatus 12 and modal probes 232, 234 are shown disposed on the other side of the bearing apparatus 12 to observe the shaft adjacent the bearing 14. In addition, a second pair of modal probes 236, 238 are disposed away from the bearing 14 and adjacent the shaft S to provide modal identification signals which can inputted to the control circuit 200 to change the bearing characteristics thru resonances. Furthermore, differential expansion or motion transducers 206 can be operatively coupled adjacent a collar of the shaft S to measure the Z translation of the shaft S.

As shown in FIG. 2, a bearing block 15 including a fluid bearing 14 circumscribes the shaft S. In this depiction, the shaft S is not symmetrically disposed within the clearance of the bearing 14 and there is a gap G at the top of the shaft greater than at the bottom. At the heart of the invention, fluid may be provided in diametrically opposed pairs through the servovalves 16, 18 shown in FIG. 2 so that a force $F_1$ is diametrically opposed by a force $F_3$ from servovalve 16 while opposed forces $F_2$ and $F_4$ are delivered through servovalve 18. These opposing forces can vary in magnitude based on the readings of the transducers 202, 204 of FIG. 1. Thus, FIG. 3 reflects the shaft S being symmetrically disposed within the bearing block 14 after appropriate fluidic pressure correction. No gap G anomalies circumscribe the shaft S within the bearing block 14. The shaft is now being stably supported and is uniformly equidistant from the bearing block 14.

On the other hand, the fluid bearing apparatus may intentionally provide fluidic forces on the shaft which result in an unsymmetrically disposed shaft within the bearing clearance. For example, if the shaft becomes unbalanced the instant invention can provide instantaneous response to the perturbation which may result in the off centering of the shaft to eliminate the unbalance and/or vibration while maintaining a minimum default tolerance between the shaft S and bearing 14.

Referring to FIGS. 4 and 5, one form of bearing 14 is disclosed. As shown in FIG. 2, fluid from the servovalves 16 and 18 (to be described) can enter into the bearing via the radial portals and pockets. Specifically the servovalve 16 delivers fluid through adapter plate 17 and the bearing block 15 and then into portals 21 and 23 while the servovalve 18 delivers fluid through adapter plate 19 and bearing block 15 and then into portals 25 and 27.

All ports communicate within the interior of the bearing block 15 via pocket 22 which in FIG. 4 is shown as being somewhat rectangular shaped. However, the actual geometrical form may be any shape. FIG. 5 shows that each pocket 22 has an arcuate cutaway 28 with a substantially constant radius of curvature.

Alternatively, and referring to FIGS. 6 and 7, a second form of bearing 14 is disclosed. As shown, fluid from the servovalves 16, 18 can enter into the radial ports via a pocket. Specifically, the servovalve 16 delivers fluid into portals 21 and 23 while the servovalve 18 delivers into portals 25 and 27. All ports communicate within the interior of the bearing 14 via pockets 22 which in FIG. 6 is shown as being somewhat "canoe" shaped. The actual geometrical form may be any shape and perhaps may be evocative of an ellipse or an oval which is characterized by having a width 24 which is parallel to the axis of the shaft and has a lesser dimension than its circumferential aspect 26. FIG. 7 shows that the pocket 22 has an arcuate cutaway 28 with a constant radius of curvature.

Also shown in FIG. 7 are a plurality of anti-swirl ports 32. These ports can be used to introduce additional fluid adjacent each radial port. A pair of anti-swirl ports 32 are located on each side of the radial port pocket (FIG. 6), spaced along an axial extent of the shaft S and extending along the width 24 of the port pocket 22. These ports 32 deter swirling and are substantially tear-drop shaped as shown in FIG. 6 having a leading edge 34 that is of a lesser dimension than the trailing edge 36. The leading edge 34 can face the direction of shaft rotation which as shown in FIG. 2 is clockwise. Each anti-swirl port 32 includes a narrow chamber 38 communicating with a widened inlet port 40 which receives a portion of its fluid from a branch passageway off of a fluid circuit 50 described in FIG. 8.

As thereshown, the fluid handling system 50 includes a main reservoir 52 that provides fluid to a high pressure pump 54. The high pressure pump 54 delivers fluid at a controlled rate to the radial inlet ports 21, 23, 25 and 27. The high pressure pump 54 may also deliver fluid to the anti-swirl inlet ports 32. The first servovalve 16 and the second servovalve 18 are interposed therebetween. The fluid is branched into two passageways, one passageway communicating with each servovalve. The servovalves 16, 18 are protected by an upstream high pressure filter 56, a high pressure reducing valve 58 and a pressure gauge 59, all of which can cause unwanted fluid to be rediverted back to the main reservoir 52.

More specifically, the high pressure filter 56 is interposed between the pump 54 and the servovalves 16, 18. Upstream from the high pressure filter 56 is a pressure reducing valve 58 having a branch 60 that leads to the main reservoir 52. Upstream from the reducing valve 58 is a safety bypass 62 on a further branch 64 leading to the main reservoir 52. Fluid exiting the servovalves 16, 18 to be described, escapes from the clearance between the shaft S and bearing 14 and is scavenged into a return reservoir 66 where it is pumped via pump 68 back into the main reservoir 52 after having been filtered at 70. The main reservoir has the fluid's temperature controlled and includes a temperature responsive outlet 72 that communicates with a cooling pump 74 which directs fluid into a heat exchanger 76 after having been filtered at 75. The heat exchanger 76 can be air or water cooled or other fluid cooling could be used. After the heat exchange stage, the fluid is redirected back to the main reservoir 52.

Figure 9:
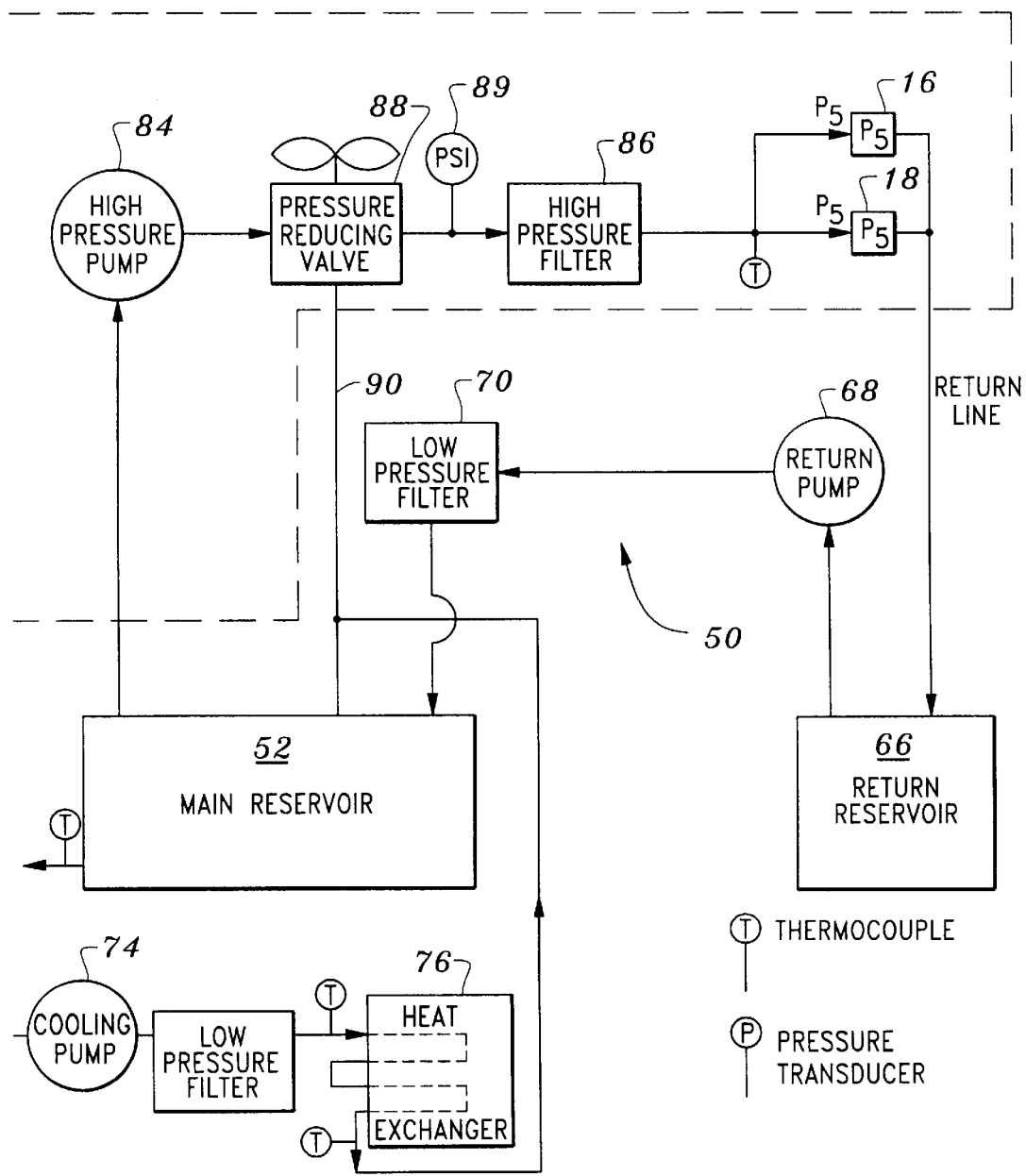
FIG. 9 is the fluid diagram shown in FIG. 8 showing additional means of how fluid is delivered to the FIG. 3 fluid bearing.

Referring to FIG. 9, the main reservoir 52 also provides fluid to a second high pressure pump 84. The high pressure pump 84 delivers fluid at a controllable rate to a "fifth port" or second stage, to be described infra, of the respective servovalves 16, 18. The fluid is branched into two additional passageways, one passageway communicating with each "fifth port" of each respective servovalve. The fifth ports of the servovalves are protected by an additional upstream high pressure filter 86 and a high pressure reducing valve 88. A pressure gauge 89 and a pressure transducer are used to monitor and provide feedback of the fluid flow to the "fifth ports".

It should be noted that many of the machines M that are intended for use in this environment such as some pumps, operate in fluid baths. The instant invention is especially advantageous in an environment involving fluid baths since the same fluid that resides within the machine can be used as the fluid material to support the shaft within the bearing block 14. What this means in effect, is that seals and expensive fluid lubrication systems could be eliminated or reduced.

Referring to FIG. 16, the signals that are sent from the transducers 202, 204 are processed by the control system 200 and then delivered as input to input leads 90 (FIG. 10) of each servovalve 16, 18 so that the diametrically opposing forces $F_1$ and $F_3$ and $F_2$ and $F_4$ can be matched to offset shaft precession and vibration. Input (to be explained) from the electrical signals generated by the transducers 202, 204 results in control signals being delivered to the servovalves 16, 18. The input leads are shown as 90 in FIG. 10.

Figure 10:
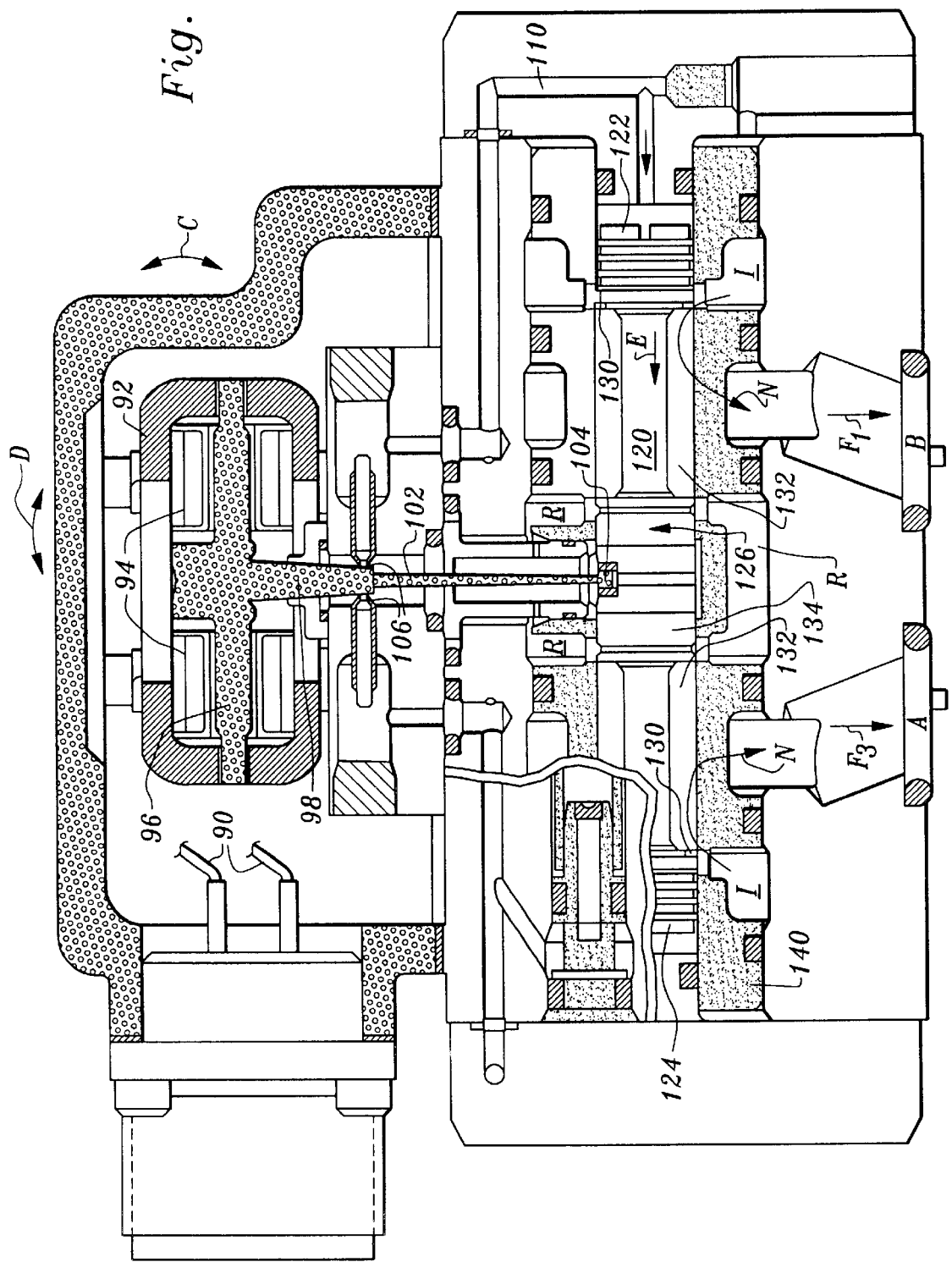
FIG. 10 shows details of a servovalve which delivers fluid to the fluid bearing.
Figure 11:
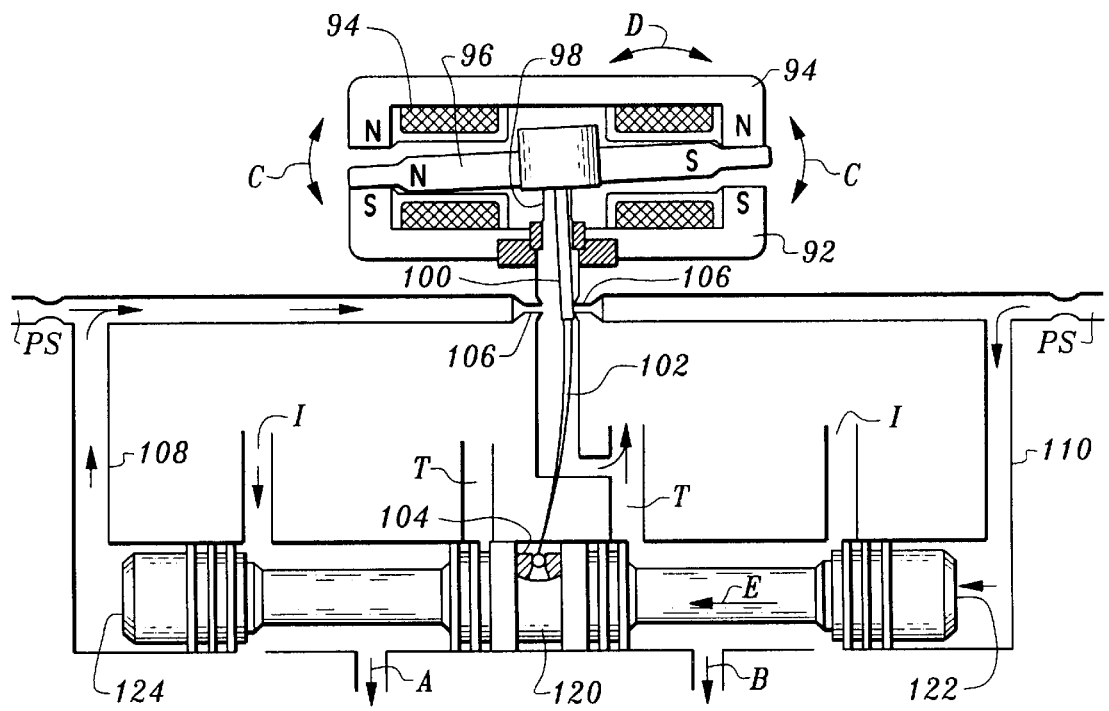
FIG. 11 shows a simplified view of the servovalve of FIG. 10 receiving a control signal.
Figure 12:
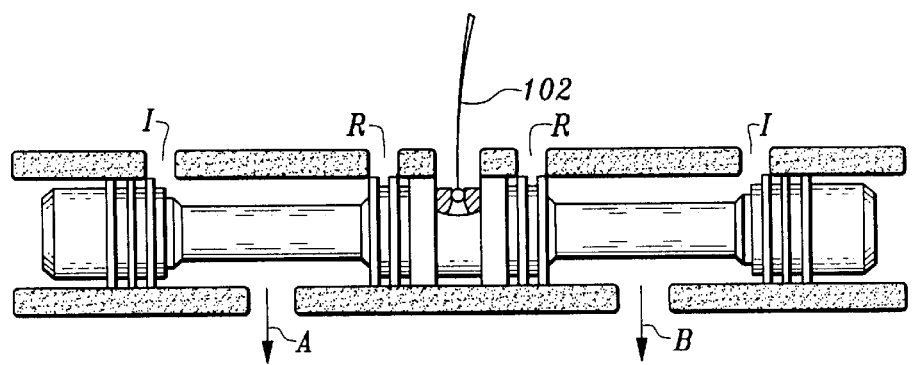
FIG. 12 shows a simplified view of a spool of the servovalve of FIG. 10 in a centered position.
Figure 13:
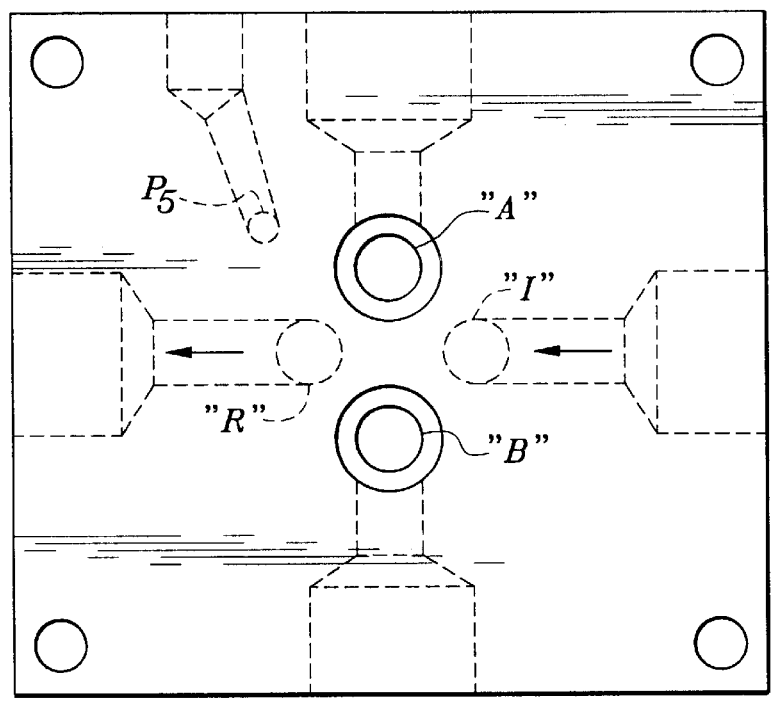
FIG. 13 shows a bottom plan view of each adapter plate shown in FIG. 2.
Figure 14:
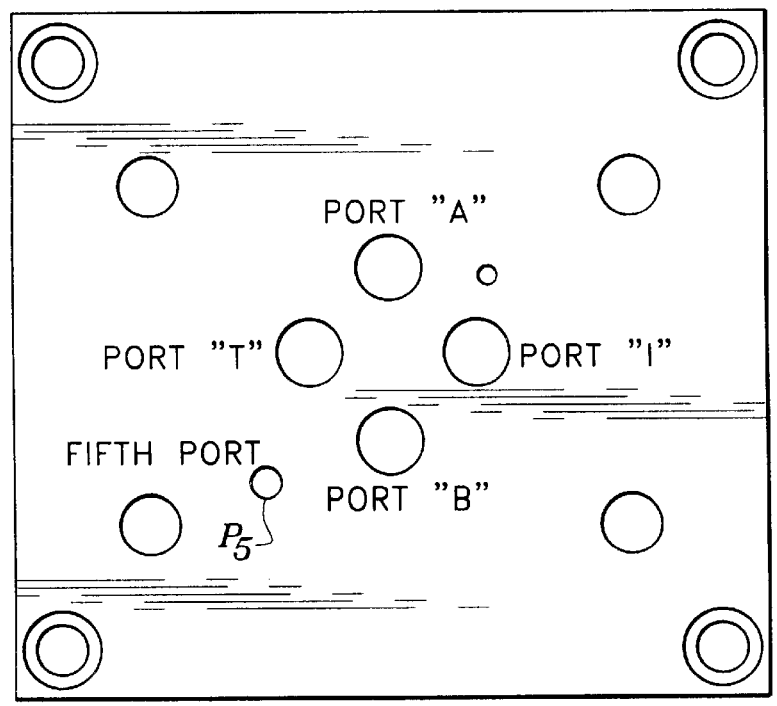
FIG. 14 shows a top plan view of each adapter plate shown in FIG. 2.

Referring to FIGS. 10 and 11, Each servovalve 16, 18 includes a first stage controller or torque motor 92 which is operatively coupled to the control system 200 via the input leads 90. The torque motor 92 converts the control signals (current signals) to a mechanical force or motion. A flexure tube 98 supports an armature 96 of the motor 92 and also acts as a fluid seal between the hydraulic and electrical sections each servovalve 16, 18. Attached at a center of the armature 96 are a flapper 100 and a feedback rod 102 having a ball or jewel piece 104 at one end. The flapper 100 and the feedback rod 102 extend down through the flexure tube 98. The flexure tube 98 acts as a spring for limiting the motion of the flapper 100 between two nozzle seats 106.

The inputs 90 are operatively coupled to a pair of coils 94 of the motor 92 and allow input signals from the control system 200 to be provided to the coils 94 for polarizing the armature ends and creating a rotational torque on the armature 96 which, in response, moves about the double ended arrow "C". The flapper 100 and the feed back rod 102 which depend from the torque motor 92 are similarly influenced along arrow "D" by the rocking motion along the double ended arrow "C". This manifests itself as providing a fluid flow bias to a pair of nozzle seats 106 located on either side of and addressing the flapper 100. The relationship of the flapper 100 with respect to the nozzle seats 106 influences the degree to which inlet hydraulic fluid passes from the "P5" ports to either a first fluid branch 108 or a second fluid branch 110. Fluid for these branches are derived from the fluid circuit shown in FIG. 9.

Hydraulic amplification results as flow from the "P5" ports (FIG. 11) is supplied to the nozzle seats 106 for control of a greater second stage flow proportional to the input signals from leads 90. Internal feedback is achieved by the use of a feedback rod 102 attached to the flapper 100, with the ball end 104 closely fitted to the second stage spool valve 120.

Referring to FIG. 11, assume the input signals cause the flapper 100 to move toward the nozzle seat 106. This results in a greater fluid flow into passageway 110 and increases pressure on a right spool head 122 causing spool movement to the left and a dynamically proportional fluid flow out of ports "A" and "B" in addition to a static bias flow of fluid out of the respective ports. The fluid will cause a bias on the spool valve 120 by running through passageways 110 and exerting a greater pressure on the one right hand-side of the spool head 122 of the spool valve 120. This will cause the spool valve to shift along the direction of the arrow "E". However, should the fluid flow have been favored into the other branch passageway 108, the direction of arrow "E" would be reversed. This can be caused by a reverse electrical input signal. Optimum flow control is achieved by feedback. With constant supply pressure and flow to the servovalves 16, 18 output control flow is infinitely proportional to the input signals and the default flow value.

The feedback rod 102 bends and applies a force to the flapper 100, which tends to recenter the flapper 100 between the nozzle seats 106. In addition, the spool 100 positioning occurs at the point at which the rod 102 feedback force equals the torque motor 92 force induced by the input signals (current). The spool 100 stops at this position, and the flapper 100 is now centered until the input signals change to a new level.

Each spool valve 100 includes two heads 98 at opposed ends of the spool valve. In addition, the spool valve has a central core 102. Both heads 98 and the core 102 provide a certain degree of sealing to control fluid flow thereabout. The hydraulic fluid from FIG. 8 enters into the servovalve 16,18 via portals and passes through a portion of the spool 100 at a flow rate controlled by the default delivery pressure into ports "I" of the servovalves 16, 18 and the relative position of the spool valve 120 in relation to its circumscribing housing 110. The housing 110 includes controlled clearance between the heads 122, 124 and an interior bore 132. Thus, fluid flowing into the passageway "I" will move along arrow "N" and exit from the servovalves 16 and 18 as forces $F_1$ and $F_3$ and $F_2$ and $F_4$ shown in FIG. 2.

Each head 122, 124 of the spool piece 120 has a machined pressure land 130 where the heads 122, 124 are in contact with the interior bore 132 of the spool valve 120. The pressure land allows fluid flow from passageway 104 to circulate constantly through to provide forces $F_1$, $F_3$ of fluid to assure that the shaft journal is receiving fluid at all times. This defines one form of default mechanism to assure that the journal is always receiving adequate fluidic support. A further "R" is protected from receiving flow by a head 134 which guards against excessive pressure build up. The core 126 is operatively coupled to the jewel piece 104 that prevents overcompensation of the spool valve 120 by reacting to strong mechanical or electrical pulse. That is, the jewel piece 104 reacts to extreme swings (throttling) of the spool valve 120 and provides counterbalancing feedback via the rod 102 to rebalance the valves 106.

The hydraulic fluid from FIGS. 8 and 9 enter into the servovalves 16, 18 via passageways "I" and "P5" of each respective adapter plate 17 and 19 (please see FIGS. 2, 15 and 16) which lead to respectively labeled ports "I" and "P5" of the servovalves 16, 18 (FIG. 11). The fluid delivered to the servovalves by the branches in FIG. 8 is directed to the "I" passageways and ports of each servovalve 16, 18. This fluid flows by the underlapped pressure lands 130 of each head 122, 124 as it passes along arrow "N" and exits to ensure that bearing 14 and shaft S are separated by a default amount of fluid at all times. Therefore, even when the spool valve 120 is in a centered position there is a fluid flow of fluid to the fluid bearing 14.

The fluid delivered to the servovalves 16, 18 as is shown in FIG. 9 is delivered to the "P5" passageways and ports of each respective adapter plate 17, 19 (figure x) and the servovalves 16, 18. Thus, when the input signals in response to a vibration or imbalance causes the flapper 100 to move toward the right side nozzle seat 106 the pressure from the "P5" ports of each respective servovalve 16, 18 is directed to the right spool head 122 and causes spool movement to the left and provides a dynamically proportional fluid flow in addition t the static bias flow to react to the rotor motion. Thus, eliminating any appreciable time lag in delivering he correcting fluid.

A schematic of the control circuit is shown in FIG. 10 and an associated block diagram is shown in FIG. 9. The operational amplifiers (op-amps) shown in FIG. 10 may be of a standard quadruple low-power type. An MC3403P op-amp as manufactured by Motorola is exemplary of a quadruple low-power op-amp. Preferable, dual power supplies are used to supply the op-amps with a 36 volt dc differential.

Referring to both FIGS. 10 and 9, the voltage outputs of the XY proximity transducers are directly coupled to non-inverting inputs (Pins 10) of op-amps 1c and 2c respectively. These proximity signals include all the information in each axis as to the position of the rotor shaft at any time. The signals include a negative DC gap voltage which represents the static position of the rotor shaft and a dynamic voltage which represents the dynamic motion of the rotor shaft. As the rotor shaft moves away from any proximity transducer the signal voltage from that transducer becomes more negative and as the rotor shaft moves toward any proximity transducer the signal voltage from that transducer becomes more positive.

In order to determine if the rotor is located at a desired position at any given time, the actual signal (proximity voltage signal) must be compared to a reference signal (a static set point) which represents the desired position of the rotor shaft. The horizontal (X) and vertical (Y) reference signals are respectively provided by op-amps 1b and 2b. These op-amps are provided with an adjustable DC voltage input and are configured as non-inverting voltage followers with unity feedback. Thus, the output of the op-amps 1b and 2b should be in phase with the proximity voltage signals input to the op-amps. Note that a manually set (or automatically set) negative DC voltage is used as an alternative to a time varying signal to represent the desired position of the rotor shaft within the bearing clearance. With both electrical circuit paths (from probes, to circuit, to acting servovalve) fixed orthogonal to one another, the two create a two dimensional coordinate of the position within the bearing.

In order to compare the static set points to the actual static and dynamic proximity voltage signals, a plurality of precision differential amplifiers (instrumentation amplifiers) are used. In a horizontal signal path, op-amps 1c, 1d and 3a and associated resistors are configured as a horizontal instrumentation amplifier while in a vertical path, op-amps 2c, 2d and 4a and associated resistors are configured as a vertical instrumentation amplifier. The gain of both the horizontal and vertical instrumentation amplifiers is one, therefore, the output of each instrumentation amplifier is the difference between each respective set point voltage and each respective proximity voltage signal. Therefore, since both signals are negative, if the proximity voltage signal is more positive than the set point, the differential output is positive and vice versa. The differential voltage signals outputted from the horizontal and vertical instrumentation amplifiers are each connected to a PID (proportional integral derivative) circuit of the control system.

A horizontal PID circuit includes op-amps 3b, 3c and 3d and a vertical PID circuit includes op-amps 4b, 4c and 4d. A horizontal proportional circuit is formed around op-amp 3c and a vertical proportional circuit is formed around op-amp 4c. Op-amps 3c and 4c are configured as inverting amplifiers having a gain set by the ratio of a feedback resistor and an input resistor to an inverting terminal of each respective op-amp 3c, 4c. The output of op-amp 3c is connected to a switch S2 of a first dip switch and the output of op-amp 4c is connected to a switch S2 of a second dip switch. The dip switches will be described infra.

A horizontal derivative circuit includes op-amp 3b and a vertical derivative circuit includes op-amp 4b. The horizontal and vertical derivative circuits are each configured with an input capacitor and a feedback resistor. Thus, the horizontal derivative circuit and vertical derivative circuit each outputs a voltage proportional to the instantaneous derivative of each respective differential signal from the instrumentation amplifiers. As a result, each derivative circuit outputs a control signal which is based on the rate of change of the input signals from the instrumentation amplifiers. Therefore, horizontal and vertical derivative control signals are produced which are correlative to the rate of change of the input signals form the instrumentation amplifiers and which allow the control circuit to respond to a range of rapid changes. The derivative circuits act to add a phase lead of ninety degrees to each of the horizontal and vertical derivative control signals. Thus, one analogy is to view this as adding anticipation to the control circuit. The gain of the derivative circuits is simply the feedback resistance times the input capacitance of each respective circuit. Note that the lowest frequency for ideal differentiation is due to the feedback resistance and input capacitance and the highest frequency for ideal differentiation is due to the input resistance and input capacitance. The outputs of the horizontal and vertical derivative circuits are respectively coupled to switch S1 of the first dip switch and to switch S1 of the second dip switch.

The PID circuit further includes both a horizontal and a vertical integrator circuit. The horizontal integrator circuit is formed around op-amp 3d which is configured as a standard inverting integrating amplifier. The horizontal integrator circuit is formed around op-amp 4d and is also configured as an inverting integrating amplifier. Both integrator circuits receive the differential voltage signal from the respective instrumentation amplifier and produce an integrated differential voltage output which is proportional to the integral of the received signal. In other words, the longer the actual motion of the rotor shaft is different than the set point, the more the control circuit tries to control shaft position within the bearing. This results in a reduction in steady state and long term position error. The gain of each integrator circuit is the inverse of its input resistance times its feedback capacitance with a phase inversion. The integrated outputs of the horizontal and vertical integrator circuits are respectively coupled to switch S3 of the first dip switch and to switch S3 of the second dip switch.

The control circuit further employs op-amps 5a and 5b and associated components to configure a dither generator. Preferably, a Wein-bridge oscillator configuration is used as the dither generator. The dither generator is used to assist in the reduction of any hysteresis of the servovalves and is designed to have a variable output frequency and a variable output amplitude. Preferably, one dither generator is provided such that it may be coupled to S4 of the first dip switch and the second dip switch. Therefore, each servovalve is provided with hysteresis compensation means.

The dip switch provides the flexibility of dialing in various combinations of control schemes and allows the overall gain of each control scheme to be determined independently of one another.

The outputs from the horizontal proportional, integral and derivative circuits are combined using a first inverting summing amplifier employing op-amp 6a. The outputs from the vertical proportional, integral and derivative circuits are combined using a second inverting summing amplifier employing op-amp 7a. Note that both the first and second inverting summing amplifiers allow for a separate adjustable gain for each of the proportional, integral and derivative signals from each PID circuit.

Preferably, the adjustable gains are accomplished by using trimpots as the input resistors of the summing amplifiers. The gain of the summing amplifiers is equal to the magnitude of the feedback resistance divided by the magnitude of the input resistance (the resistance of the trimpot).

The output of each summing amplifier is coupled to a voltage to current converter circuit. A horizontal voltage to current converter circuit is build around op-amp 6b and a vertical voltage to current converter is built around op-amp 7b. A first series connected torque converter of the first servovalve is operatively coupled in a feedback loop of the horizontal converter circuit and a second series connected torque converter of the second servovalve is operatively coupled in a feedback loop of the vertical converter circuit. Each converter circuit includes a trimpot operatively coupled between an input of each op-amp and circuit ground. Each trimpot may be adjusted to provide a desired scale of conversion between the horizontal and vertical control voltages and a horizontal and a vertical control current being delivered to the respective torque converters of the servovalves.

Furthermore, op-amps 5c and 7c are respectively configured as a horizontal and a vertical non-inverting unity voltage follower. The horizontal voltage follower is operatively coupled to the first summing amplifier and the vertical voltage follower is operatively coupled to the second summing amplifier. The horizontal and vertical voltage followers act to buffer the respective horizontal and vertical control voltages from the summing amplifiers to a computerized acquisition system to be used as process variable units.

As seen in FIG. 16, a system is provided for X, Y and Z shaft excursions of a prime mover M. Fluid handling goes to the bearings 14. The fluid's effect is shown by the transducers 202, 204 which generate a signal processed as set forth above. Archived data stored in a processor 250 and monitored by monitor 252 can condition signals into the fluid handling system or implement shut down and/or maintenance and provide a display thereof.

The bearing system 12 in cooperation with the control system 200 and the fluid handling system 50 provides means for aligning the rotor shaft as the machine is running or on-line. The bearing system provides continuous alignment of the rotor shaft while machine temperatures are warming up and thermal growth is taking place. In effect, the bearing apparatus 12 and fluid handling system 50 allocates, under control, a large quantity of constantly flowing fluid to the shaft to maintain hydrostatic effectiveness. In addition, the instant invention provides a dynamically proportional fluid flow in addition to the static bias flow to actively align the shaft as the machine is running or on-line and the control system 200 provides, inter alia, shaft position feedback. Therefore, the bearing system also allows one to experiment with different clearance positions of the rotor shaft with respect to the bearing until a clearance is found which results in optimum machine performance. Processor 250 and monitor 252 can be used to process, store and display the experimental data.

In addition, the bearing system provides the ability to instantaneously control a shaft imbalance in order to afford an operator time to either shut the machine down or to continue operation until an appropriate course of action is decided. For example, a turbine blade section or a total blade breaks loose. The imbalance of the machine is so drastic and quick occurring that a machine operator would have no opportunity to shut the machine down much less make a judgment fast enough to react to this type of catastrophe. The bearing system solves this problem by instantaneously responding to a drastic imbalance to preclude a catastrophic machine failure. For example, if the shaft becomes unbalanced the instant invention can provide an instantaneous differential fluid force to opposed areas of a rotating shaft resulting in the off centering of the shaft to eliminate the extreme unbalance and vibration while maintaining a minimum default tolerance between the shaft S and bearing 14.

A further important attribute of the bearing system is that it allows one to directly measure machine forces acting on the shaft without having to go back and look at the dynamic response of the rotor shaft which is a response to the forces and stresses of the machine. The bearing system allows one to look at the cause of the imbalance correlative to machine forces.

Machine forces include, inter alia, imbalanced forces, gravitational forces, preload forces and fluid forces. All of these forces act on the rotor shaft and the rotor shaft reacts according to these forces. The bearing system reacts to the machine forces to stabilize the machine. Therefore, the forces of fluid impressed on the rotor are correlative to machine forces impressed on the fluid. Thus, by processing the control signal which is responsible for the fluidic forces on the rotor, a real time signal is obtained which is correlative to the machine forces. Accordingly, the machine forces are discerned directly and not inferred from shaft monitoring apparatus.

The bearing system may also be employed as a perturbation device for use in discerning machine parameters. For example, in FIG. 16 control signals from the controller may be sent to the servovalves to create an externally applied perturbation force on the rotor shaft. The externally applied force causes a response from the rotor which is monitored by the FIG. 16 transducers to ascertain the parameters of the machine while the machine remains on-line.

FIGS. 23A and 23B detail a second form of the horizontal and vertical controller circuit. FIG. 24 details direct and quadrature compensation circuits as yet another form of the horizontal and vertical controller.

FIGS. 25 and 26 detail one form of a horizontal and vertical controller circuit for providing system modeling using, for example, and referring to FIG. 16, the modal probes 232, 234 adjacent the shaft remote from the bearing apparatus 12 and the second pair of modal probes 236, 238 (FIG. 28) disposed away from the bearing 14 and adjacent the shaft S to provide modal identification signals which characteristics of system resonances. Furthermore, differential expansion or motion transducers 206 can be operatively coupled to the controller circuit to measure the Z translation of the shaft S.

Figure 27:
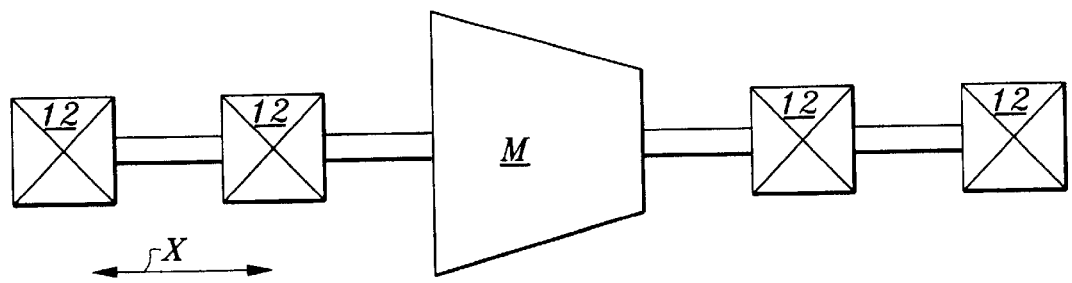
FIG. 27 is a schematic view of a pair of hydrostatic fluid bearings separated by an axial distance being disposed on sides of the shaft between which the load is imposed.

FIG. 27 shows an important implementation of the bearing system in the configuration of a pair of the hydrostatic fluid bearings being separated by an axial distance X disposed on each side of the shaft between which a load is imposed. The two narrowly separated bearings on both sides of the machine M tremendously increases the stiffness of the machine and therefore its stability.

Figure 29:
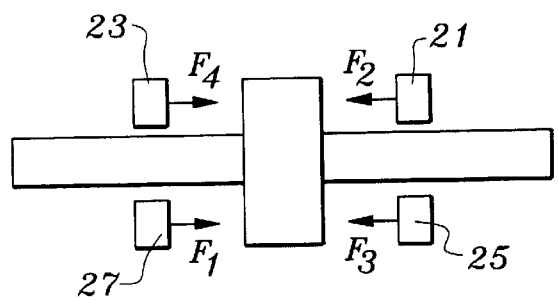
FIGS. 29, 30 and 31 are schematic views of how the hydrostatic fluid bearing apparatus according to the present invention can be used to provide fluid compensation to Z axial translation.
Figure 30:
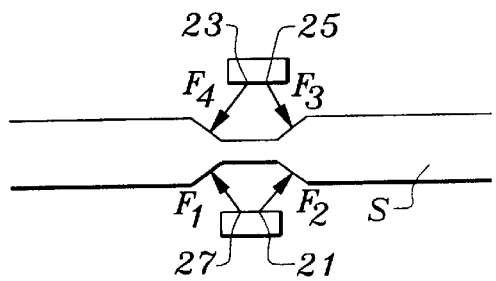
Figure 31:
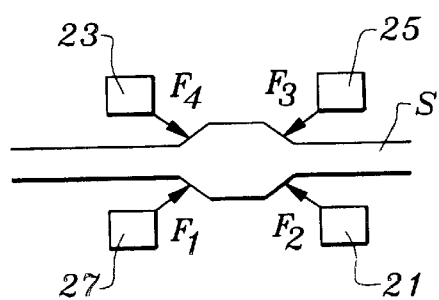

Further important implementation of the bearing system are shown in FIGS. 29, 30 and 31. These figures are schematic views of how the hydrostatic fluid bearing system according to the present invention can be used to provide fluid compensation for X, Y and Z axial. In FIG. 29 the fluidic forces in the axial or Z direction work on an element disposed on the shaft S. FIG. 30 shows the fluidic forces working on troughs disposed in the shaft to provide fluid compensation. In FIG. 31, the fluidic forces are shown working on ramps of the shaft to provide stability and alignment.

Moreover, having thus described the invention, it should be apparent that numerous structural modifications and adaptations may be resorted to without departing from the scope and fair meaning of the instant invention as set forth hereinabove and as described hereinbelow by the claims.

We claim:

1. A bearing system for controlling shaft precession, comprising, in combination:
   a shaft,
   a bearing block circumscribing said shaft, said block having portal means directed to said shaft,
   incompressible fluid passing through said portal means to support said shaft away from said block,
   precession detecting means coupled to said shaft,
   and incompressible fluid directing means driven by said detecting means and driving the incompressible fluid through said portals to oppose shaft precession.

2. The bearing system of claim 1 wherein the incompressible fluid directing means includes means for providing a default flow rate of incompressible fluid to pass through said portal means to support said shaft away from said block.

3. The bearing system of claim 1 wherein the incompressible fluid directing means, under the control of said precession detecting means, drives a differential flow of incompressible fluid through said portal means to oppose shaft precession.

4. The bearing system of claim 3 wherein said portal means includes at least one pair of opposed portals operatively coupled to said incompressible fluid directing means which, under the control of said precession detecting means, drives a differential flow of incompressible fluid through said pair of opposed portals to provide diametrically opposed fluidic forces to oppose shaft precession.

5. The bearing system of claim 4 wherein said portal means includes two pair of opposed portals operatively coupled to said incompressible fluid directing means which, under the control of said precession detecting means, drives a differential flow of incompressible fluid through said two pair of opposed portals to provide diametrically opposed fluidic forces from each said pair of portals to oppose shaft precession.

6. The bearing system of claim 5 wherein said precession detecting means includes at least one pair of XY sensors which convert shaft precession to an electrical signal and a control circuit including means to compare these input signals with a set of reference signals correlative to a desired shaft location relative to the bearing.

7. The bearing system of claim 6 wherein said control circuit further includes a plurality of PID (proportional integral derivative) control circuits operatively coupled to said comparing means to accept the outputs of the comparing means as input signals and provide PID output control signals which are a derivative of, an integral of and proportional to the input signals from the comparing means.

8. The bearing system of claim 7 wherein said PID output signals of each PID circuit are converted by a converter circuit which outputs a feedback signal which drives said incompressible fluid directing means to direct a differential fluid flow and therefore, differential fluid forces onto the shaft in addition to said default flow rate to react against system forces to actively control the dynamic motion, position and stability of the shaft.

9. A method of abating shaft precession, the steps including:
   monitoring a shaft for precession,
   opposing shaft precession by fluid contact with the shaft including delivering the fluid in diametrically opposed streams to the shaft through portals,
   determining whether the opposing streams should have pressure differentials, and
   delivering the differential pressure to the portals.

10. The method of claim 9 further including delivering a default flow rate of incompressible fluid to the shaft through said portals.

11. A shaft support, comprising, in combination:
    a bearing block,
    a shaft passing through said bearing block,
    sensors to monitor shaft precession,
    means to compare sensor output versus a standard,
    means to deliver continuous quantities of fluid to said bearing block based on sensor data,
    and means to prevent swirl at an area between said shaft and bearing block.

12. A method for simulating differential shaft forces to identify operating parameters of a rotor shaft of an on-line machine, the steps including:
    inducing stimulus to a rotor shaft correlative of a system anomaly;
    monitoring a real time response signature of the rotor shaft;
    processing the real-time response signature to obtain machine characteristics;
    applying a correlative stimulus to the rotor shaft; and
    monitoring subsequent artifacts correlative of the anomaly being rectified.

13. The method of claim 12 wherein inducing stimulus include injecting fluid through portals directed to the shaft.

14. The method of claim 13 wherein applying a correlative stimulus to the rotor shaft includes the step of injecting a differential rate of fluid to the shaft through said portals.

15. A method for measuring internal machine forces acting on a rotating shaft of a running machine, the steps including:
    directing a fluidic force on the rotating shaft of the machine from at least one valve under the direction of a control signal;
    monitoring the shaft in response to the fluidic forces directed thereon;
    providing a corrective control signal to at least one valve; and controlling the fluidic force on the shaft until the shaft is repositioned.

16. The method of claim 15 further including the step of directing a continuous default flow rate of fluid on the rotating shaft of the machine from at least one valve.

17. A hydrostatic fluid bearing for supporting a shaft of a machine, comprising, in combination:
- a bearing block circumscribing the shaft, said block having portal means directed to the shaft;
- a fluid handling means for providing a bias flow of fluid through said portal means to support said shaft away from said block;
- means for directing a dynamically proportioned fluid flow through said portal means in addition to said static bias flow for promulgating stable shaft rotation.

18. The apparatus of claim 17 further including means for monitoring dynamic position information of the shaft.

19. The apparatus of claim 18 further including means for transforming said dynamic position information from said monitoring means into control signals.

20. The apparatus of claim 19 further including feedback means for feeding back control signals to control said means for providing a dynamically proportioned fluid flow to control the passage of fluid through said portal means to provide fluidic forces which react with the shaft to actively reduce machine vibration and provide stable shaft rotation.

* * * * *